US012783326B1

(12) United States Patent
Ehiemua

(10) Patent No.: US 12,783,326 B1
(45) Date of Patent: Nov. 3, 2026

(54) DYNAMIC ORCHESTRATION AND MIGRATION OF GRAPHICAL PROCESSING RESOURCES IN COMPUTING ENVIRONMENTS

(71) Applicant: WESCO Distribution, Inc., Pittsburgh, PA (US)

(72) Inventor: Robert Omoijade Ehiemua, Round Rock, TX (US)

(73) Assignee: WESCO Distribution, Inc., Pittsburgh, PA (US)

( * ) Notice: Subject to any disclaimer, the term of this patent is extended or adjusted under 35 U.S.C. 154(b) by 0 days.

(21) Appl. No.: 19/437,659

(22) Filed: Dec. 31, 2025

(51) Int. Cl.
*G06F 9/50* (2006.01)
*G06F 9/445* (2018.01)
*G06F 11/14* (2006.01)

(52) U.S. Cl.
CPC ........ *G06F 9/5088* (2013.01); *G06F 9/44505* (2013.01); *G06F 11/1407* (2013.01); *G06F 2209/5019* (2013.01); *G06F 2209/503* (2013.01)

(58) Field of Classification Search
CPC ............... G06F 9/5088; G06F 9/44505; G06F 11/1407; G06F 2209/5019; G06F 2209/503
See application file for complete search history.

(56) References Cited

U.S. PATENT DOCUMENTS

| | | | | |
|---|---|---|---|---|
| 2022/0318044 | A1* | 10/2022 | Hermenier | G06F 9/5077 |
| 2023/0297453 | A1* | 9/2023 | Viclizki | G06N 3/045 714/47.2 |
| 2024/0020142 | A1* | 1/2024 | Jindgar | G06N 20/20 |
| 2026/0023587 | A1* | 1/2026 | McClure | G06F 9/45558 |

* cited by examiner

*Primary Examiner* — Wissam Rashid
(74) *Attorney, Agent, or Firm* — K&L Gates LLP

(57) ABSTRACT

Systems, methods, and computer-readable media for dynamically orchestrating graphical processing resources in distributed computing environments. A computing system includes a scheduling component, an orchestration component, and local agents coordinates real-time allocation of partitioned graphical-processing devices. The scheduling component receives workload requests and communicates them to the orchestration component, which determines whether to reconfigure available graphical-processing instances across multiple nodes. A local agent checkpoints active workloads in memory, issues control commands through a device-management interface to create, delete, or resize partitions, restores the workloads to resulting instances, and resumes execution without disruption. The orchestration component may maintain a cluster-wide inventory, perform cross-node migration through high-bandwidth interconnects, collect telemetry data, and apply predictive models for proactive reconfiguration and defragmentation.

20 Claims, 9 Drawing Sheets

DYNAMIC ORCHESTRATION AND MIGRATION OF GRAPHICAL PROCESSING RESOURCES IN COMPUTING ENVIRONMENTS

TECHNICAL FIELD

The present disclosure relates generally to computing infrastructure and resource management in high-performance and artificial-intelligence (AI) cluster environments. More particularly, this disclosure pertains to dynamic orchestration, partitioning, and migration of graphical processing resources.

BACKGROUND

The use of GPUs has become fundamental to modern AI, machine learning (ML), and high-performance computing (HPC) workloads. A single graphical processing resource such as a graphical processing unit (GPU) node can host multiple workloads in parallel, but conventional approaches to sharing GPU resources are limited by the static nature of hardware partitioning.

Recent generations of GPUs, such as those supporting MIG functionality, allow a physical GPU to be divided into several independent compute instances, each with its own dedicated memory and processing cores. This capability theoretically enables multiple users or jobs to share a single GPU more efficiently. However, current MIG management tools require predefined partition profiles that are configured manually or through fixed templates. In typical deployments, administrators drain workloads, reboot nodes, or reapply static configuration files whenever different workload sizes are needed. These static methods lead to fragmentation, idle capacity, and significant administrative overhead in dynamic or heterogeneous cluster environments.

Attempts to automate MIG configuration have been largely limited to scripts or device-plugin extensions that respond to container scheduling events. Such approaches cannot resize GPU slices in real time or migrate workloads non-disruptively. As a result, existing solutions often leave GPUs under-utilized—sometimes operating at less than twenty percent of available capacity—while other jobs remain blocked awaiting a suitable partition size. In large-scale AI clusters, this inefficiency translates to increased hardware cost, energy consumption, and latency.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for dynamically orchestrating graphical processing resources in a distributed computing environment. The method includes receiving, by a computing system may include a scheduling component, a workload request specifying a graphical processing resource requirement. The method includes communicating, by the scheduling component, the workload request to an orchestration component that manages allocation of graphical processing resources across multiple computing nodes. The method includes determining, by the orchestration component, based on an inventory of available graphical processing instances on the computing nodes, whether to reconfigure a partitioned graphical processing resource. The method includes checkpointing, by a local agent of the computing system, an active workload associated with a graphical processing device into a memory to preserve an execution state of the workload. The method includes issuing, by the local agent, a command through a device management interface to perform a reconfiguration of the partitioned graphical processing resource corresponding to the determination. The method includes restoring, by the local agent, the active workload from the memory onto a resulting graphical processing instance after completion of the reconfiguration. The method includes executing, by the computing system, the workload on the resulting graphical processing instance while maintaining execution of other workloads without interruption. Other embodiments of this aspect include corresponding computer systems, apparatus, and computer programs recorded on one or more computer storage devices, each configured to perform the actions of the methods.

Implementations may include one or more of the following features. The method may include maintaining, by the orchestration component, a cluster-wide inventory may include available graphical processing instances, corresponding memory capacities, and utilization metrics for the computing nodes. The method may include migrating, by the orchestration component, a checkpointed active workload to another computing node through a high-bandwidth interconnect. The method may include collecting telemetry data representing utilization, temperature, and error conditions from each graphical processing device and transmitting the telemetry data to the orchestration component to inform subsequent allocation decisions. The method may include applying, by the orchestration component, a predictive model trained on historical telemetry data to forecast graphical processing demand and initiating pre-emptive reconfiguration of partitioned graphical resources. The method may include intercepting, by the scheduling component, the workload request through a dynamic resource-allocation interface integrated with a cluster scheduler. The method may include performing, by the computing system, predictive defragmentation by consolidating lightly utilized processing instances and freeing capacity for anticipated workloads. The method may include hosting, by the computing system, an artificial intelligence inference service that dynamically resizes graphical processing partitions based on memory or compute requirements of individual inference tasks. Implementations of the described techniques may include hardware, a method or process, or computer software on a computer-accessible medium.

One general aspect includes a computing system for dynamic orchestration of graphical processing resources in a distributed computing environment. The computing system includes a scheduling component operable to receive workload requests and generate resource-allocation messages. The system includes an orchestration component communicatively coupled to the scheduling component and operable to maintain an inventory of graphical processing instances across multiple computing nodes, determine whether to reconfigure a partitioned graphical processing resource based on the workload requests, and issue reconfiguration commands. The system includes a local agent executed on each computing node, the local agent is operable to: store an execution state of an active workload in a memory to create a checkpoint, issue one or more control commands through a device management interface to perform the reconfiguration of the partitioned graphical processing resource in accordance with the reconfiguration commands, restore the active workload from the memory onto a resulting graphical processing instance following completion of the reconfiguration, and resume execution of the workload on the resulting graphical processing instance while maintaining execution of other workloads without interruption. The computing system is operable to perform non-disruptive, real-time allocation, resizing, and migration of graphical processing resources across the distributed computing environment. Other embodiments of this aspect include corresponding computer systems, apparatus, and computer programs recorded on one or more computer storage devices, each configured to perform the actions of the methods.

Implementations may include one or more of the following features. The orchestration component of the system may be operable to maintain a cluster-wide inventory may include available graphical-processing instances, corresponding memory capacities, and utilization metrics for the computing nodes. The local agent may be operable to migrate a checkpointed workload to another computing node through a high-bandwidth interconnect. The system may include a telemetry analyzer to collect telemetry data that may include utilization, temperature, and error-condition data from each graphical-processing device and to transmit the telemetry data to the orchestration component for adaptive resource management. The orchestration component may include a predictive orchestration engine trained on historical telemetry data to forecast graphical-processing demand and to initiate pre-emptive reconfiguration of partitioned resources. The scheduling component may include a dynamic resource-allocation interface integrated with a cluster scheduler to provide deterministic reserve-then-bind scheduling of graphical-processing resources. Implementations of the described techniques may include hardware, a method or process, or computer software on a computer-accessible medium.

One general aspect includes a non-transitory computer-readable medium storing instructions that, when executed by one or more processors of a computing system for dynamic orchestration of graphical processing resources in a distributed computing environment, cause the computing system to: receive, by a scheduling component, a workload request specifying a graphical processing resource requirement. The instructions cause the computing system to communicate, by the scheduling component, the workload request to an orchestration component that manages allocation of graphical processing resources across multiple computing nodes. The instructions cause the computing system to determine, by the orchestration component, based on an inventory of available graphical processing instances, whether to reconfigure a partitioned graphical processing resource. The instructions cause the computing system to checkpoint, by a local agent of the computing system, an execution state of an active workload associated with a graphical processing device into a memory. The instructions cause the computing system to issue, by the local agent, one or more control commands through a device management interface to perform the reconfiguration of the partitioned graphical processing resource in accordance with a determination to reconfigure the partitioned graphical processing resource. The instructions cause the computing system to restore, by the local agent, the active workload from the memory onto a resulting graphical processing instance following completion of the reconfiguration. The instructions cause the computing system to execute the workload on the resulting graphical processing instance while maintaining execution of other workloads without interruption to enable real-time, non-disruptive allocation, resizing, and migration of graphical processing resources across the distributed computing environment. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the instructions may cause the computing system to maintain a cluster-wide inventory of graphical-processing instances and utilization metrics to guide reconfiguration decisions. The instructions may cause the computing system to migrate a checkpointed workload to another computing node through a high-bandwidth interconnect. The instructions may cause the computing system to collect and transmit telemetry data describing utilization, temperature, and error conditions of graphical-processing devices to the orchestration component for analysis. The instructions may cause the computing system to apply a predictive model trained on historical telemetry data to forecast graphical-processing demand and perform pre-emptive partition resizing. The instructions may cause the computing system to dynamically resize graphical-processing partitions in response to memory or compute requirements of variable artificial-intelligence inference tasks. Implementations of the described techniques may include hardware, a method or process, or computer software on a computer-accessible medium.

DESCRIPTION

Figure 1:
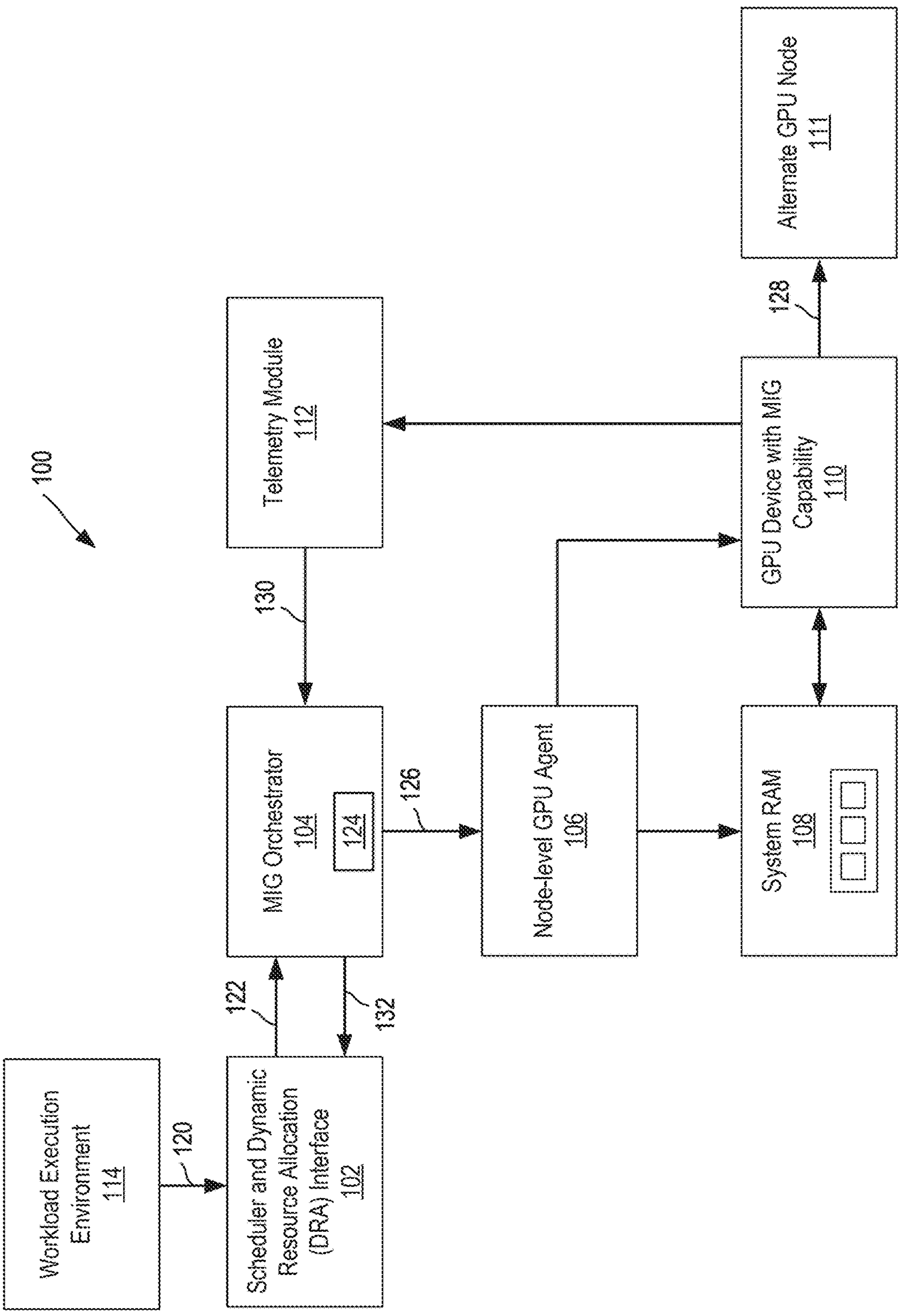
FIG. 1 is a flow diagram illustrating a dynamic MIG orchestration flow, according to one aspect of the present disclosure.

The following description is presented for purposes of illustration and to enable a person skilled in the art to make and use the subject matter described herein. The scope of the present disclosure is defined by the appended claims.

Throughout this description, identical reference numbers designate identical or functionally similar elements.

Conventional GPU partitioning frameworks suffer from static configuration and disruptive reallocation procedures that prevent efficient utilization of GPU resources in cluster environments. When using current MIG management utilities, each GPU must be manually pre-partitioned into fixed-size slices defined by static profiles. Changing the configuration of those slices requires draining active workloads and rebooting or reinitializing the node, resulting in significant downtime and loss of throughput.

This rigidity leads to resource fragmentation when workload requirements differ from predefined partition sizes. Small workloads may occupy oversized partitions, leaving residual GPU memory and compute cores unused, while larger workloads are blocked until a compatible partition is made available. Administrators are forced to manually adjust configurations or segregate nodes by MIG size profiles (e.g., 10 GB, 20 GB, 40 GB nodes), creating scheduling complexity and operational inefficiency.

Moreover, existing automation scripts and device plugins lack the capability to dynamically resize GPU slices or migrate workloads while maintaining job continuity. They cannot coordinate partition changes with job schedulers such as Kubernetes or Simple Linux Utility for Resource Management (SLURM), nor can they leverage real-time telemetry or predictive algorithms to anticipate GPU load. Consequently, cluster utilization typically remains below twenty percent, with jobs delayed or preempted due to incompatible GPU configurations.

The underlying technical problem therefore is to provide a software-defined orchestration system capable of performing real-time, non-disruptive GPU partitioning and migration across multiple nodes. Such a system dynamically determines feasible configurations, checkpoints and restores active workloads in system memory, and coordinates with the scheduler to ensure deterministic, safe, and efficient resource allocation without manual intervention or node reboots.

Checkpointing refers to the process of capturing and storing the current execution state of a running workload, such as a container, process, or virtual machine, so that it can later be restored and resumed from that same state rather than restarted from the beginning. In other words, checkpointing creates a snapshot of an active workload's memory, registers, file descriptors, and runtime context at a specific point in time. Within the dynamic MIG orchestration system, checkpointing is used to pause an active GPU workload temporarily before a MIG reconfiguration (e.g., when creating, deleting, or resizing a partition). Initially, the workload's runtime state is saved into system memory or memory buffer, such as random-access memory (RAM). Then the GPU performs reconfiguration (reslice or migrate) while the workload is safely preserved. Once the reconfiguration is completed, the workload is restored from the saved state, ensuring non-disruptive continuation. Thus, checkpointing enables live migration, dynamic resizing, and recovery without interrupting execution.

The present disclosure provides a dynamic GPU orchestration system that resolves the above-described inefficiencies by enabling on-demand partitioning, reslicing, and migration of MIG resources in real time. The disclosed system introduces an integrated orchestration architecture composed of a scheduler layer, a MIG orchestrator, and node-level GPU agents, all operating in coordination to dynamically allocate GPU capacity according to workload demand.

The computing infrastructure and resource management according to the present disclosure operate in high-performance and artificial-intelligence (AI) cluster environments. The computing infrastructure and resource management provide dynamic orchestration, partitioning, and migration of GPUs that support MIG functionality. The disclosed systems and methods enable on-demand creation, resizing, and relocation of GPU partitions within container-oriented and high-performance-computing (HPC) clusters through software-defined orchestration. In certain embodiments, the disclosure further relates to checkpoint-restore and predictive scheduling techniques that improve utilization, reduce latency, and provide elastic, cloud-like GPU resources across distributed computing environments. Accordingly, the present disclosure provides an adaptive orchestration framework capable of dynamically creating, resizing, and deleting GPU partitions based on real-time workload demand, while ensuring non-disruptive operation for running jobs. The present disclosure further provides systems that integrate checkpoint-restore mechanisms, predictive scheduling, and telemetry feedback to maintain optimal GPU utilization across multi-node clusters without requiring manual intervention or system downtime.

When a workload request specifying GPU resources is received, a resource-allocation interface, such as a dynamic resource allocation (DRA) application programming interface (API) intercepts the request and consults the MIG orchestrator. The MIG orchestrator maintains a cluster-wide inventory of GPU partitions and evaluates available capacity and feasibility for reconfiguration. Based on this assessment, the orchestrator issues commands to a node-level GPU agent that interfaces with underlying GPU management APIs to create, delete, or resize MIG instances without disrupting other active workloads.

The system further employs a checkpoint-restore migration mechanism to maintain workload continuity during resizing or relocation events. Prior to reconfiguring a GPU, the agent checkpoints the active workload into system RAM, performs the requested reslicing or reallocation operation, and then restores the workload on the target MIG instance. If a local GPU cannot be resized safely, the system triggers a cross-node migration, checkpointing the workload and restoring it on a different GPU node over a high-bandwidth interconnect such as InfiniBand or NVLink.

An optional telemetry and predictive orchestration module monitors GPU utilization, health, and error conditions using telemetry data (e.g., from a data center GPU manager [DCGM] or similar tools). This data is fed back to the MIG orchestrator, allowing it to anticipate future load patterns and perform pre-emptive reslicing or defragmentation of GPU resources to maximize throughput.

In operation, the system converts static GPU partitioning into an elastic, software-defined service, delivering up to a 10× improvement in cluster efficiency as measured by industry-standard OSC latency and bidirectional bandwidth benchmarks. The disclosed framework allows heterogeneous workloads—ranging from small AI inference tasks to large-scale training jobs—to share GPU clusters seamlessly, achieving cloud-like elasticity while maintaining isolation and non-disruptive performance continuity.

The present disclosure provides systems, methods, and computer-readable media for dynamic orchestration, partitioning, and migration of GPUs that support MIG operation in distributed computing environments. The disclosed technology enables real-time, software-defined control of GPU resources across containerized and high-performance-computing (HPC) clusters, allowing GPU slices to be created, resized, or reallocated on demand without interrupting active workloads or requiring node reboots.

In one embodiment, a MIG orchestration system includes a scheduler interface, a MIG orchestrator, and node-level GPU agents. The scheduler interface—implemented, for example, through a DRA API—intercepts GPU resource requests from cluster jobs and communicates them to the MIG orchestrator. The MIG orchestrator maintains a cluster-wide inventory of GPU capacity, determines an optimal configuration based on workload requirements, and issues reconfiguration commands to the GPU agents. The GPU agents interface with GPU management APIs to create, delete, or resize MIG instances in real time, while maintaining workload isolation and continuity.

To prevent disruption during reconfiguration, the system employs a checkpoint-restore migration mechanism. When resizing or migration is required, the GPU agent checkpoints the active workload into system RAM, performs the MIG reconfiguration, and restores the workload to the newly created partition. If a GPU cannot be safely resized locally, the checkpointed workload is transferred to another node through a high-bandwidth interconnect such as InfiniBand or NVLink, ensuring non-disruptive cross-node migration.

In certain embodiments, a telemetry and predictive orchestration module monitors GPU utilization, memory health, and performance metrics via a telemetry subsystem (for example, the data center GPU manager). The telemetry data is fed back to the orchestrator to facilitate predictive re-partitioning and proactive defragmentation of GPU resources. ML models may further anticipate upcoming workload patterns to schedule reslicing or migration operations ahead of demand.

The disclosed system transforms static GPU partitioning into an elastic, self-optimizing resource layer, enabling cluster-wide GPU utilization improvements of up to 10× compared with conventional static MIG configurations, as verified using industry-standard OSC latency and bidirectional bandwidth benchmarks. The framework supports diverse workloads, including AI inference and training pipelines, and allows service providers to deliver cloud-like GPU elasticity while preserving isolation, stability, and throughput.

In one illustrative use case, a ChatGPT-style AI inference service submits variable-sized models to a GPU cluster. The orchestration system dynamically resizes or migrates MIG partitions to match each model's compute and memory requirements in real time, maintaining low latency and high utilization without manual intervention.

Accordingly, the disclosed techniques provide a technical improvement to computer resource management, offering an adaptive, non-disruptive approach to GPU partitioning, workload migration, and predictive orchestration in modern AI and HPC clusters.

One embodiment of the present disclosure describes a dynamic orchestration system that enables on-demand partitioning, reslicing, and migration of MIGs in container-oriented and high-performance-computing (HPC) environments.

Unlike conventional static MIG configurations, the disclosed system continuously monitors workload demands and reconfigures GPU partitions in real time without draining workloads or rebooting nodes.

The orchestration architecture consists of three cooperating layers: a scheduler layer, a MIG orchestrator, and node-level GPU agents. Together these components allow GPU capacity to behave as an elastic, software-defined resource, analogous to virtualized central processing units (CPUs) and memory allocation in cloud infrastructures.

When a workload such as an AI inference job, a model-training task, or a visualization process requests GPU resources, the scheduler layer intercepts the request through a resource-allocation interface. The MIG orchestrator determines the optimal GPU partitioning plan, communicates reconfiguration commands to the appropriate node-level agent, and monitors execution through telemetry feedback. If necessary, the orchestrator performs checkpoint-restore migration of the workload to a different node to maintain non-disruptive operation.

The orchestration framework can be realized entirely in software running on existing GPU hardware. In one example implementation, the scheduler interface is embodied by a DRA API available in Kubernetes 1.26 or later; the MIG orchestrator executes as a cluster controller process; and each node hosts a lightweight GPU agent that interfaces with GPU management APIs such as the NVIDIA management library (NVML). Other embodiments may employ equivalent APIs or management layers without departing from the scope of the present disclosure.

FIG. 1 is a flow diagram illustrating a dynamic MIG orchestration flow 100, according to one aspect of the present disclosure. The orchestration flow 100 depicts the interaction between a scheduler and dynamic resource-allocation interface, a MIG orchestrator, node-level GPU agents during reserve-and-bind operations, GPU reslicing, and checkpoint-restore migration to enable real-time, non-disruptive allocation of GPU resources across a computing cluster.

The dynamic MIG orchestration flow 100 shows the interaction between a scheduler and DRA interface 102, a MIG orchestrator 104, and node-level GPU agents 106 during reserve-and-bind operations, GPU reslicing, and checkpoint-restore migration as described in the present disclosure.

The scheduler and DRA interface 102 receives an incoming workload submission 120 from a containerized application, pod, or high-performance-computing (HPC) job. The interface 102 intercepts the request prior to node binding and forwards it to the MIG orchestrator 104. The MIG orchestrator 104 serves as a central control component maintaining a cluster-wide inventory of GPU partitions, available capacity, and workload assignments. During a reserve phase 122, the MIG orchestrator 104 evaluates current utilization to determine whether a suitable MIG slice already exists. If no matching partition is available, the orchestrator enters a planning phase 124, in which it formulates a reconfiguration plan—such as creating, deleting, or resizing a MIG instance—to satisfy the workload request.

The plan is transmitted to a node-level GPU agent 106 operating on the target compute node. During an execution phase 126, the agent invokes GPU management API calls, for example through the NVML, to implement the reconfiguration plan. Before modifying GPU resources, the node-level GPU agent 106 checkpoints the active workload into system RAM 108 to preserve state during reslicing or migration. A GPU device with MIG capability 110 is then reconfigured while other workloads continue executing uninterrupted, after which the workload is restored from the checkpoint onto the resulting partition.

Each GPU device with MIG capability 110 includes multiple independently addressable GPU instances that host workloads within corresponding workload-execution environments. Depending on resource conditions, the restored workload may resume on the same GPU slice (reslicing) or be migrated to another node via a reslice or migration path 128, enabling non-disruptive workload continuity across the cluster to an alternate GPU node 111.

A telemetry module 112 monitors GPU utilization, temperature, memory health, and error events and returns this information as telemetry feedback 130 to the MIG orchestrator 104. The MIG orchestrator 104 updates its resource inventory and uses the telemetry data to perform predictive reslicing and defragmentation during subsequent allocation cycles.

Upon workload completion 132, the MIG orchestrator 104 determines whether to retain the freed MIG slice in a "keep-warm" state for predicted reuse or to delete the slice to release capacity. Through the cooperative interaction of the scheduler and DRA interface 102, MIG orchestrator 104, node-level GPU agent 106, and telemetry module 112, the orchestration flow 100 implements a reserve-then-bind scheduling cycle that ensures deterministic provisioning while providing real-time, software-defined GPU elasticity. The system dynamically balances utilization and minimizes idle resources across the cluster without interrupting active computations.

Figure 2:
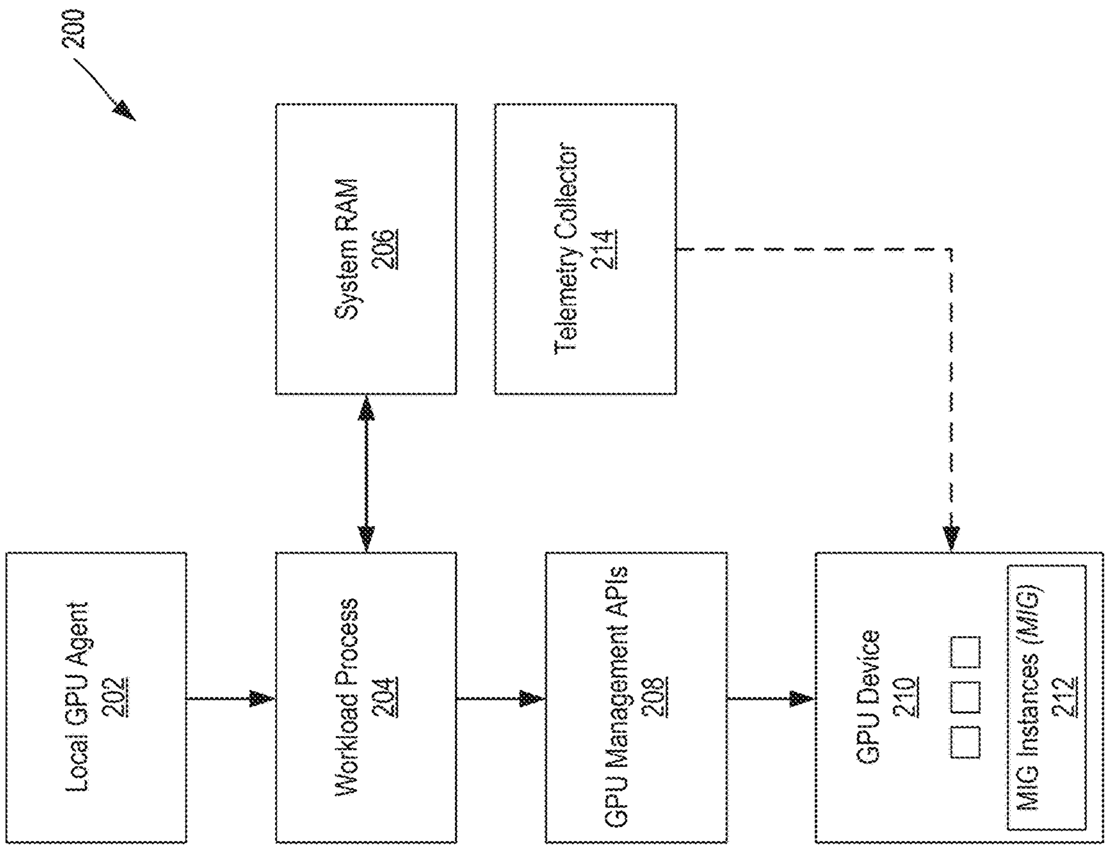
FIG. 2 is a block diagram illustrating a node-level orchestration flow, according to one aspect of the present disclosure.

FIG. 2 is a block diagram illustrating a node-level orchestration flow 200, according to one aspect of the present disclosure. In the node-level orchestration flow 200, a local GPU agent checkpoints an active workload into system memory, invokes GPU management APIs to dynamically reconfigure MIG partitions, and restores the workload to ensure seamless, non-disruptive execution within a single GPU node.

The node-level orchestration flow 200 is executed within a single GPU node during dynamic reconfiguration of MIG partitions. Local GPU reslicing operations are performed by a GPU agent using GPU management APIs to reconfigure (e.g., create, delete, or resize) MIG instances within a single node while checkpointing and restoring workloads in system RAM. A local GPU agent 202, implemented as a daemon or driver module on the host system, for example, serves as the primary control component responsible for managing MIG configurations under the supervision of the cluster-level MIG orchestrator 104 described in FIG. 1.

With reference now to FIGS. 1 and 2, upon receiving a reconfiguration instruction from the MIG orchestrator 104, the local GPU agent 202 initiates a controlled checkpoint-restore sequence to preserve workload continuity. The local GPU agent 202 first pauses an active workload process 204, representing a containerized application, pod, or job running on an existing MIG partition, and transfers its execution state into a system RAM checkpoint buffer 206. The buffer, located in volatile system memory, temporarily stores the workload's runtime context, model weights, and intermediate computational data required to resume execution without loss of progress.

After the workload has been safely checkpointed, the local GPU agent 202 invokes one or more GPU management APIs 208, which provide an abstract interface to the GPU firmware. Through these APIs 208, the local GPU agent 202 issues commands to the GPU device 210 to delete, create, or resize MIG instances 212 according to the received reconfiguration plan. The GPU device 210, supporting multiple independently addressable MIG slices, executes the partitioning operation while allowing other slices and workloads to continue running uninterrupted.

Once the reconfiguration is complete, the local GPU agent 202 restores the workload state from the system RAM checkpoint buffer 206 and resumes execution on the newly created or resized MIG partition. This sequence enables real-time, non-disruptive reconfiguration of GPU partitions without requiring a node reboot or workload termination.

A telemetry collector 214 continuously monitors local GPU metrics such as temperature, memory utilization, and error events. It reports operational status and health data to the cluster-level orchestrator, allowing the system to confirm successful completion of the reconfiguration and to update global utilization statistics. In certain embodiments, this telemetry data is also used by a predictive scheduling model to optimize future partitioning and workload migration decisions.

Figure 3:
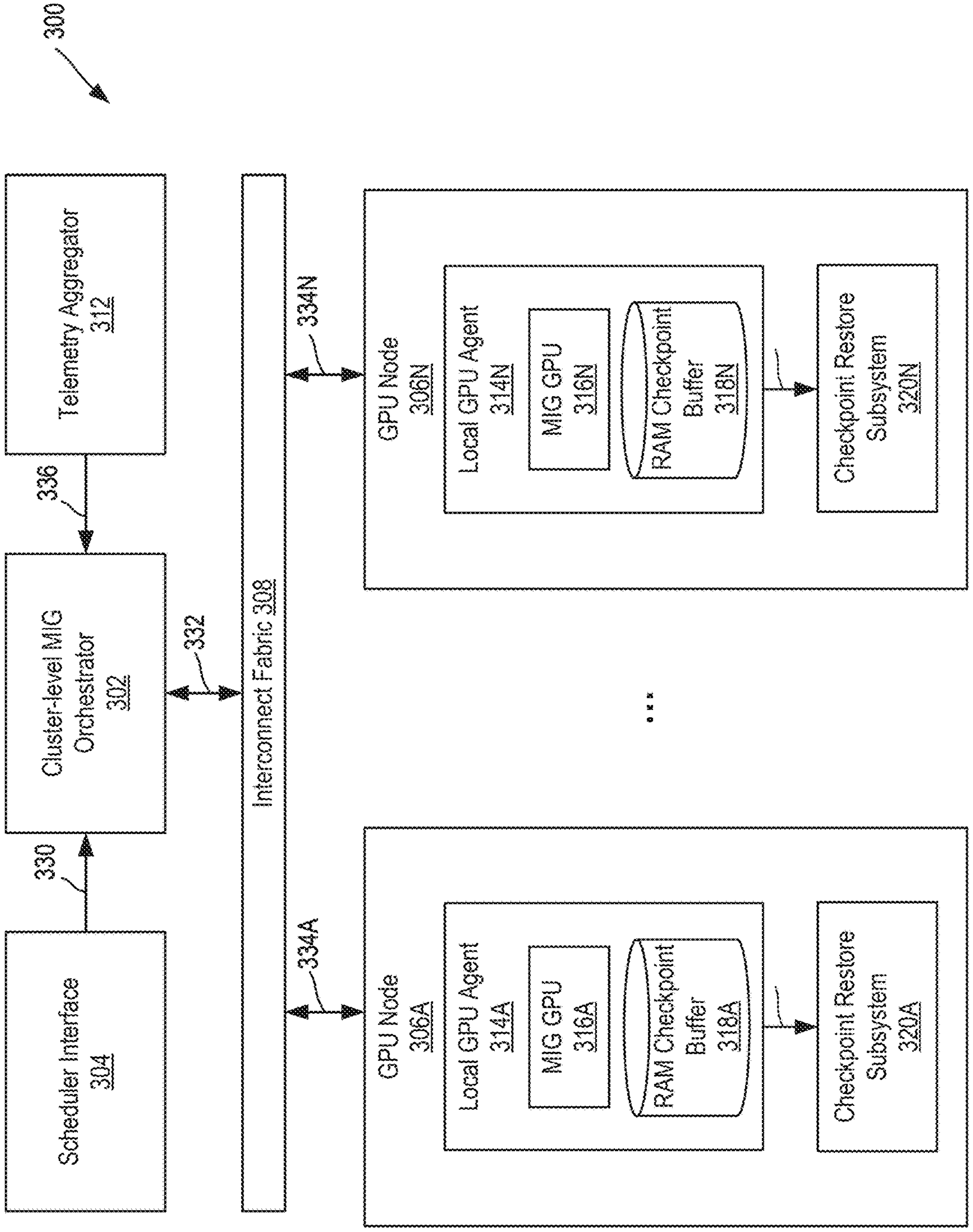
FIG. 3 is a flow diagram illustrating a cluster-wide orchestration and migration flow, according to one aspect of the present disclosure.

If a local GPU fault—such as an uncorrectable error correction code (ECC) memory error—prevents successful reslicing, the local GPU agent 202 triggers a fallback migration, checkpointing the affected workload and transferring it to another GPU node as described with respect to FIG. 3.

Accordingly, FIG. 2 illustrates the internal sequence of operations that enable non-disruptive, real-time MIG management at the node level. The described control flow allows each GPU node to reconfigure its hardware partitions, checkpoint and restore active workloads, and maintain seamless execution, forming the foundational mechanism for dynamic GPU orchestration across the cluster.

FIG. 3 is a flow diagram illustrating a cluster-wide orchestration and migration flow 300, according to one aspect of the present disclosure. A MIG orchestrator coordinates with multiple GPU nodes to perform cross-node checkpoint-restore migration of workloads over a high-bandwidth interconnect for GPU and CPU processors in accelerated systems, propelling data and calculations to actionable results such as, for example, InfiniBand (IB) or NVLink, ensuring non-disruptive workload continuity and predictive resource balancing. InfiniBand (IB) is a computer networking standard used in HPC that features very high throughput and very low latency.

A cluster-level MIG orchestrator 302 coordinates with a scheduler interface 304, multiple GPU nodes 306A-306N, an interconnect fabric 308, a checkpoint-restore subsystem 310, and a telemetry aggregator 312 to perform real-time, non-disruptive allocation, migration, and predictive optimization of GPU workloads across a distributed computing environment.

According to the cluster-wide orchestration and migration flow 300 for dynamically managing MIG resources across a distributed computing environment shown in FIG. 3, the MIG orchestrator coordinates with multiple GPU nodes to perform cross-node checkpoint-restore migration of workloads over a high-bandwidth interconnect such as InfiniBand or NVLink, ensuring non-disruptive workload continuity and predictive resource balancing. The architecture shows how a cluster-level MIG orchestrator 302 cooperates with a scheduler and reserve-bind interface 304, multiple GPU nodes 306A-306N, a high-bandwidth interconnect fabric 308 such as InfiniBand, NVLink, or Ethernet-RDMA, a checkpoint-restore subsystem 310, and a telemetry aggregator 312 to achieve real-time, non-disruptive allocation and migration of workloads.

Operation begins when the scheduler interface 304 receives a workload request specifying GPU resources and transmits 330 the request to the cluster-level MIG orchestrator 302, which maintains a global resource map of GPU partitions, memory capacity, and utilization metrics across all participating nodes. Based on this data, the cluster-level MIG orchestrator 302 performs a planning phase 332 to determine the optimal node for execution, considering factors such as available MIG capacity, predicted utilization, and workload affinity.

The cluster-level MIG orchestrator 302 then issues 324A (324N) an orchestration command to the corresponding node-level agent 314A (314N) on the selected GPU node 306A (306N), for example. The local GPU agent 314A (314N) invokes GPU management APIs 316A (316N) to create, delete, or resize MIG partitions on the node's GPU hardware. During this local execution phase, the workload is checkpointed into system RAM 318A (318N) and restored upon completion of the reconfiguration, maintaining seamless continuity of execution.

If the cluster-level MIG orchestrator 302 determines that a local GPU cannot accommodate a workload or reslicing request, a cross-node migration is performed. The checkpoint-restore subsystem 320A (320N) serializes the workload state from the source node's system RAM 318A and transfers it over the interconnect fabric 308 to a destination node capable of executing the workload. The workload is restored at the destination GPU 316A and resumes operation with minimal latency—typically below one millisecond—so that no interruption is perceptible at the application level.

Throughout operation, the telemetry aggregator 312 continuously collects and consolidates utilization, memory, and health data from all GPU nodes and reports the aggregated telemetry to the MIG orchestrator 302. The MIG orchestrator 302 uses this telemetry as predictive feedback to refine its scheduling and partitioning logic, optionally applying ML models to anticipate workload trends. In some embodiments, the orchestrator proactively consolidates lightly utilized slices or frees capacity on specific nodes in anticipation of larger workloads.

Through this cooperative control loop—encompassing scheduling, planning, local execution, migration, and predictive feedback—the cluster maintains near-continuous utilization, minimizes fragmentation, and achieves efficiency improvements of up to ten times compared with static GPU configurations, as validated by the Ohio Supercomputing Center (OSC) latency and bidirectional bandwidth benchmarks. Workloads remain isolated and uninterrupted while GPU resources are dynamically reshaped across the cluster, enabling elastic, cloud-like GPU orchestration in high-performance and AI computing environments.

Figure 4:
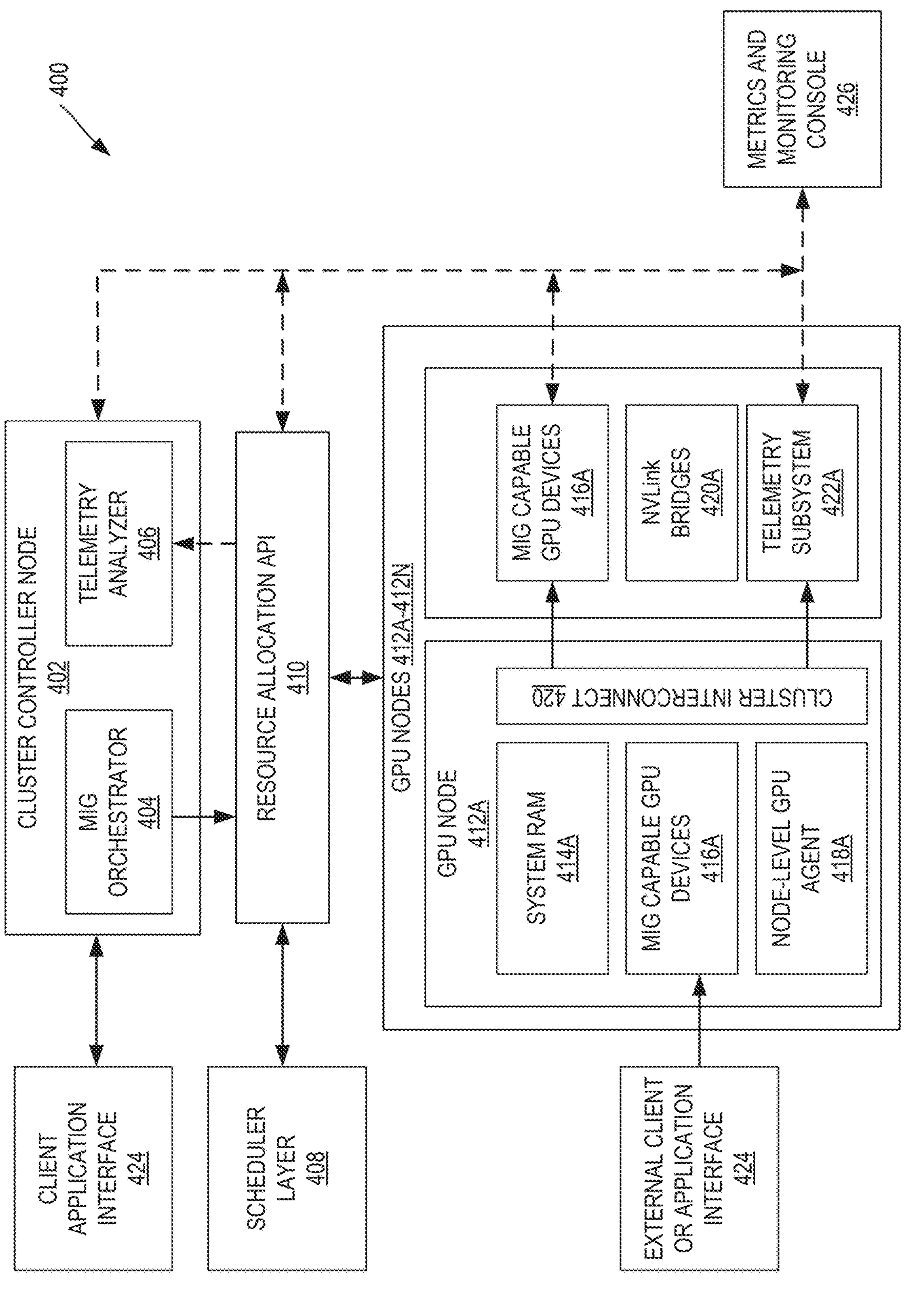
FIG. 4 is a block diagram illustrating an example hardware and computing environment, according to one aspect of the present disclosure.

FIG. 4 is a block diagram illustrating an example hardware and computing environment 400, according to one aspect of the present disclosure. A cluster controller, scheduler layer, and multiple GPU nodes are interconnected by a high-speed fabric cooperate with telemetry and checkpoint subsystems to implement dynamic MIG orchestration, migration, and predictive optimization across an AI and high-performance-computing cluster.

The hardware and computing environment 400 are suitable for implementing the dynamic MIG orchestration framework, including a cluster controller executing an orchestration service, a scheduler interface, multiple GPU nodes interconnected through a high-speed fabric, and associated telemetry and checkpoint-restore subsystems. A cluster controller node 402 hosts a MIG orchestrator 404 and a telemetry analyzer 406. The cluster controller node 402 maintains global visibility of GPU capacity and coordinates partitioning, migration, and telemetry analysis across the cluster.

A scheduler layer 408 communicates with the orchestrator through a resource-allocation API 410 that intercepts incoming GPU requests from workloads or job schedulers. This interface implements a reserve-then-bind negotiation process in which the scheduler layer 408 initially requests a provisional GPU allocation and the MIG orchestrator 404 validates and finalizes the assignment once a compatible partition is identified. Bidirectional control links between the scheduler layer 408 and the MIG orchestrator 404 maintain continuous synchronization of workload status and resource availability.

The cluster includes multiple GPU nodes 412A-412N interconnected through a high-speed cluster interconnect 420, such as InfiniBand, NVLink, or remote direct memory access (RDMA)-enabled Ethernet. Each GPU node 412A contains system RAM 414A used as a checkpoint buffer, one or more MIG-capable GPU devices 416A interconnected by NVLink bridges 420A, and a node-level GPU agent 418A that executes orchestration commands from the orchestrator. The node-level GPU agent 418A interfaces with GPU management APIs to reconfigure (e.g., create, delete, or resize) MIG partitions while preserving workload continuity through checkpoint-restore operations performed in system RAM 414A.

Telemetry data from each GPU node 412A is collected by a distributed telemetry subsystem 422A, which aggregates performance metrics such as GPU utilization, memory health, error rates, and thermal status. The telemetry subsystem 422A provides feedback to both the MIG orchestrator 404 and telemetry analyzer 406, enabling predictive reslicing, pre-emptive migration, and balanced resource utilization across the cluster.

An external client or application interface 424 represents user-facing services such as AI inference pipelines, generative-AI assistants, or model-training workloads. Incoming requests from this interface trigger dynamic orchestration events that adjust GPU partitioning in real time. A metrics and monitoring console 426 provides visibility into cluster performance, displaying GPU utilization, OSC benchmark results, and latency metrics that confirm efficiency improvements of up to tenfold compared with static MIG configurations.

Collectively, the components shown in FIG. 4 depict a scalable and adaptive computing environment in which dynamic GPU partitioning, checkpoint-restore migration, and telemetry-driven optimization operate in concert to deliver elastic, high-efficiency resource management for heterogeneous AI and high-performance-computing workloads.

Figure 5:
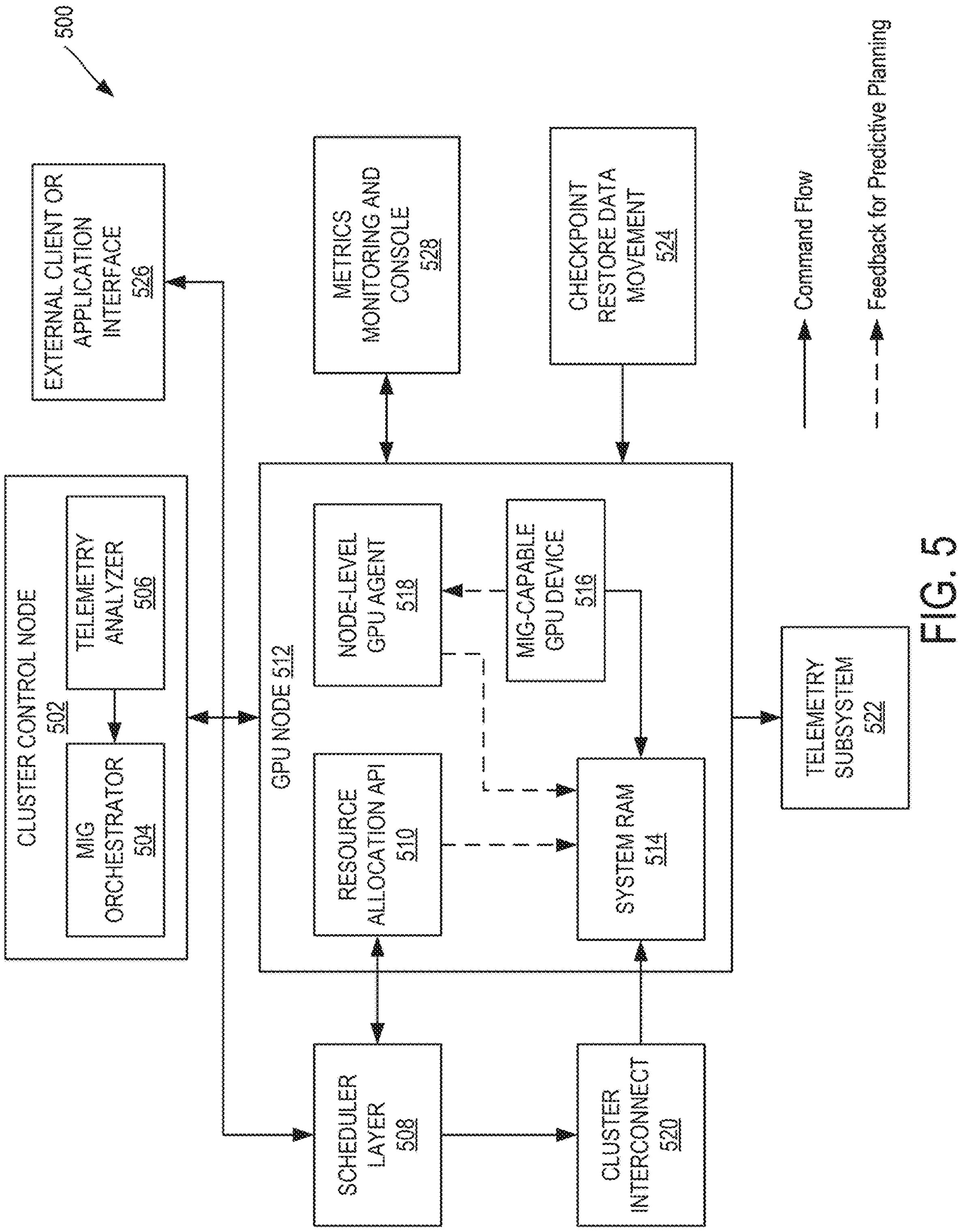
FIG. 5 is a block diagram illustrating an example computing environment, according to one aspect of the present disclosure.

FIG. 5 is a block diagram illustrating an example computing environment 500, according to one aspect of the present disclosure. The computing environment 500 implement a dynamic MIG orchestration framework, showing a cluster controller with an orchestrator and telemetry analyzer communicating with a scheduler layer and multiple GPU nodes interconnected by a high-speed fabric to enable real-time, non-disruptive GPU partitioning, checkpoint-restore migration, and predictive resource optimization.

The computing environment 500 includes a cluster controller node 502 hosting a MIG orchestrator 504 and an associated telemetry analyzer 506. The cluster controller communicates with a scheduler layer 508 through a resource-allocation API 510, which intercepts incoming workload requests and exchanges reservation and binding messages with the MIG orchestrator 504 during job scheduling. The MIG orchestrator 504 maintains a global inventory of available GPU partitions across the cluster and issues reconfiguration commands as workload demands fluctuate.

A plurality of GPU nodes 512 are connected to the cluster controller by a high-speed cluster interconnect 520 such as InfiniBand, NVLink, or Ethernet-RDMA. Each GPU node 512 includes system RAM 514 functioning as a checkpoint buffer, one or more MIG-capable GPU devices 516 interconnected by local NVLink bridges 517, and a node-level GPU agent 518 responsible for executing management commands received from the MIG orchestrator 504. When a reconfiguration command is issued, the node-level GPU agent 518 pauses the active workload, checkpoints its execution state into system RAM 514, and invokes GPU management API calls to reconfigure (e.g., create, delete, or resize) MIG partitions on the corresponding GPU device 516. Once reconfiguration is complete, the workload is restored from the checkpoint and resumes execution on the newly created partition.

Telemetry data generated by the GPU nodes 512 and collected through the node-level GPU agent 518 are transmitted to the telemetry subsystem 522 and the telemetry analyzer 506, which aggregates utilization, memory health, and performance metrics across all nodes. The telemetry analyzer 506 provides feedback to the MIG orchestrator 504, enabling predictive re-partitioning and pre-emptive migration. Dashed feedback paths in FIG. 5 represent this bidirectional flow of telemetry data between the telemetry subsystem and the orchestrator, while solid paths represent the command flow.

A checkpointing and migration path 524 connects the system RAM 514 of different GPU nodes 512 to enable workload migration. When a GPU node 512 cannot safely accommodate a reconfiguration operation, the workload is serialized in RAM on the source node, transmitted across the cluster interconnect, and restored on a target GPU node using a container snapshot-and-restore mechanism. Bidirectional arrows between system RAM and GPU devices indicate checkpoint-restore data movement, while a cross-node migration path illustrates cluster-wide workload relocation.

External workloads originate from an external client or application interface 526 representing user-facing AI services, such as a ChatGPT-style inference platform submitting model-inference requests of varying computational sizes. These requests trigger dynamic reslicing, reallocation, or migration events managed automatically by the MIG orchestrator 504. An optional metrics and monitoring console 528 provides visibility into GPU utilization, historical telemetry data, and performance benchmarks, including OSC latency and bandwidth measurements demonstrating up to ten-fold efficiency improvement compared with static partitioning.

As shown in FIG. 5, solid arrows represent command flow from the scheduler layer through the MIG orchestrator 504 to the node-level GPU agents 518, dashed arrows indicate telemetry feedback from the GPU nodes 512 to the MIG orchestrator 504, and bidirectional arrows between system RAM 514 and the node-level GPU agents 518 denote checkpoint-restore operations. The cross-node migration path highlights seamless workload relocation across the cluster. Collectively, these interactions depict a cohesive hardware and software environment in which the orchestrator, scheduler, and telemetry subsystems cooperate to achieve real-time, non-disruptive GPU partitioning and migration across heterogeneous computing resources.

Figure 6:
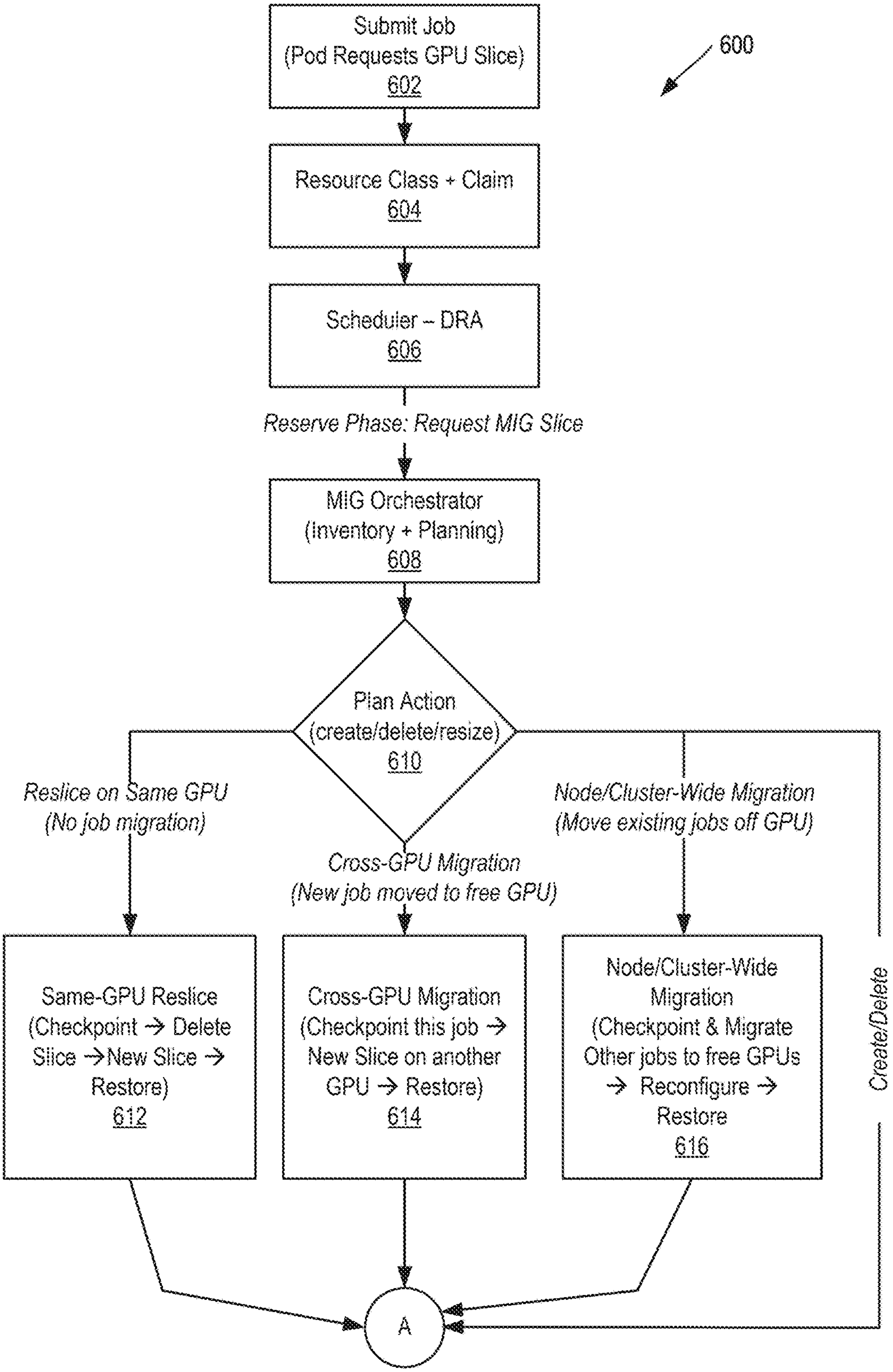
FIG. 6 illustrates a dynamic MIG orchestration flow, according to one aspect of the present disclosure.
Figure 6:
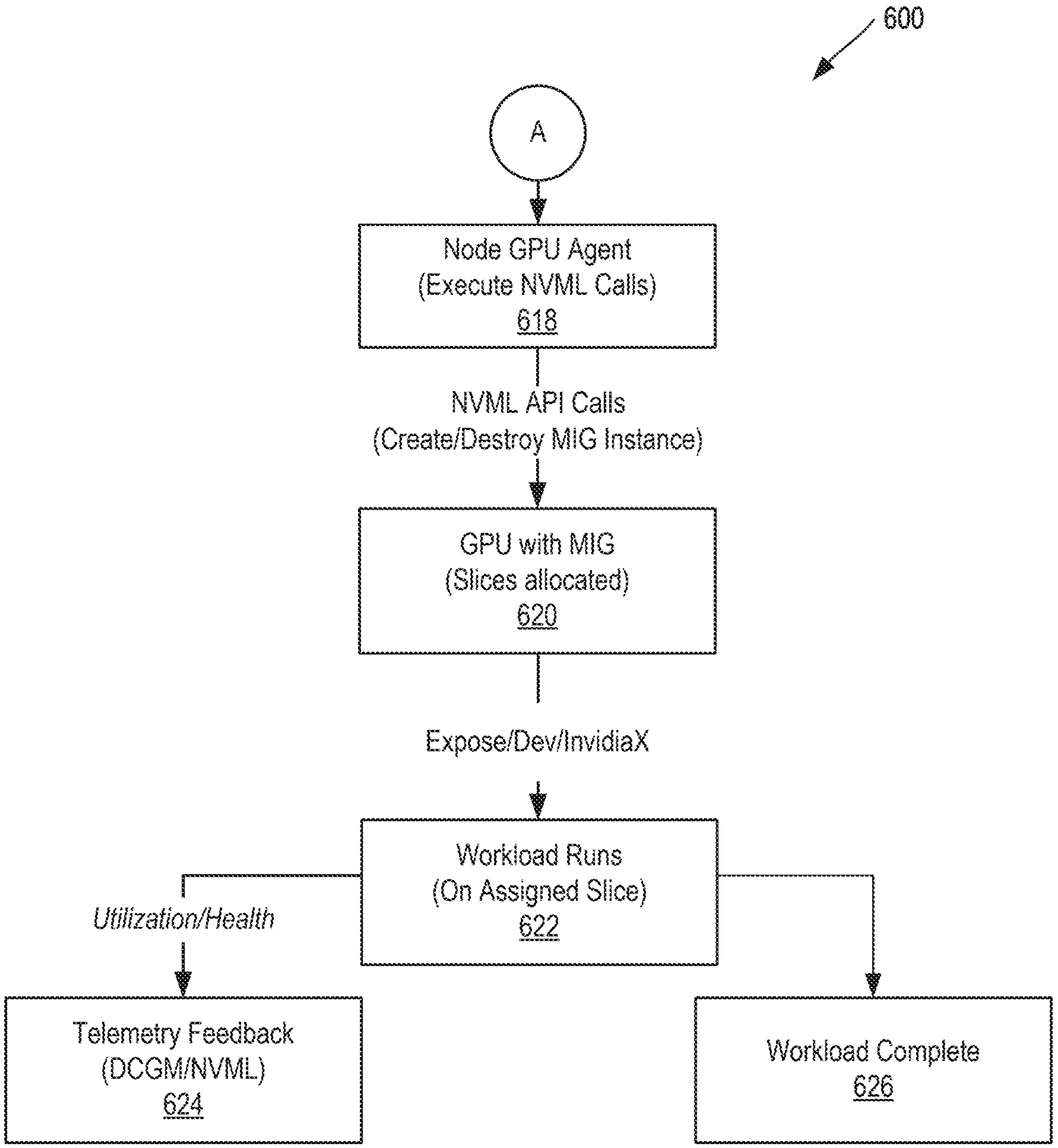

FIG. 6 is a flow diagram illustrating a dynamic MIG orchestration flow 600, according to one aspect of the present disclosure. The dynamic MIG orchestration flow 600 depicts the interaction among a scheduler—DRA interface, a MIG orchestrator, and node-level GPU agents during job submission, planning, reslicing, cross-GPU and cluster-wide migration, and non-disruptive partition creation using NVML APIs to enable real-time elastic GPU allocation across a distributed computing cluster. The dynamic MIG orchestration flow 600 illustrates the overall process encompassing job submission, orchestration, reslicing, migration, and feedback.

In one embodiment, the dynamic MIG orchestration flow 600 according to one aspect of the present disclosure may be implemented entirely in software through a collection of cooperating services operating within a computing cluster comprising GPU-capable nodes as described in FIGS. 1-5. In various embodiments, the cluster is managed by a container-orchestration platform such as Kubernetes, although the same orchestration principles may be applied to traditional high-performance-computing (HPC) schedulers such as SLURM.

The dynamic MIG orchestration flow 600 process begins when a job submission 602 is received from a user workload or container pod requesting a GPU slice. The job submission process represents the initial GPU-resource request from a user workload or pod. During this stage, a resource class and claim 604 is generated and transmitted through a reserve phase in which a request for a MIG slice is sent to a central scheduler—DRA interface, which maintains 606 a queue of pending workload requests and their corresponding GPU requirements. During the reserve phase, the central scheduler intercepts the workload request and consults the MIG orchestrator to reserve an appropriate MIG resource prior to binding. Accordingly, the central scheduler—DRA interface intercepts workload GPU requests from containerized or HPC jobs and forwards them to the orchestrator before binding. A MIG orchestrator service, implemented as a controller within the cluster, continuously maintains 608 an up-to-date inventory of GPU resources, including each active MIG partition, its utilization, and available unallocated capacity. The MIG orchestrator is the central control component maintaining cluster-wide inventory, evaluating workload requests, generating reconfiguration plans, and issuing commands to node agents When a new request arrives, the scheduler consults the MIG orchestrator to determine an optimal placement plan of action 610. The reslice or migration path are routes showing restoration of the workload to the same GPU (reslice) or transfer to another node (cross-migration). During the planning phase, the MIG orchestrator determines whether to create, delete, or resize a MIG instance and formulates a plan action. Based on current GPU inventory and workload characteristics, the orchestrator may select one of several reconfiguration operations: (1) same-GPU reslice 612, in which the orchestrator performs a local resize by checkpointing the job, deleting the existing slice, creating a new slice of a different size, and restoring the workload; (2) cross-GPU migration 614, in which the workload is checkpointed and restored on a different GPU slice located on another node; or (3) node- or cluster-wide migration 616, in which other jobs are checkpointed and relocated to free sufficient capacity, the target GPUs are reconfigured, and workloads are restored.

After the plan is finalized, a node-level GPU agent executes 618 a series of NVML API calls to implement the requested reconfiguration by creating or destroying MIG instances on the local GPU device. The node-level agent carries out the plan via GPU management APIs while checkpointing workload data in system RAM. The node-level GPU agent executes GPU management API commands (create, delete, resize) on local GPUs and performs checkpoint-restore of workloads. System RAM provides temporary checkpoint storage buffer preserving workload state during reslicing or migration. The GPU with MIG capability then allocates 620 the specified slices, exposing each as an independent logical GPU device (for example, expose/dev/nvidiaX) that can be assigned to the requesting container or job. The GPU with MIG capability is a physical GPU containing multiple independently addressable MIG slices for concurrent workloads. The workload runs 622 on the assigned slice. A telemetry module monitors GPU utilization, temperature, and errors and reports 624 telemetry data to the MIG orchestrator for optimization. In the workload execution environment, the container, pod, or HPC job executes on the assigned MIG slice. Telemetry feedback 624 is a data path showing telemetry information returned to the MIG orchestrator for predictive reslicing and defragmentation. Workload is completion 626 is the event at which the MIG orchestrator determines whether to retain or delete idle MIG slices based on predicted reuse.

In operation, when a pod requests a MIG instance of a specific profile—such as "2g.10gb"—the orchestrator examines the cluster inventory to locate a compatible or larger free slice. If such a slice exists, the scheduler binds the pod to that node and exposes the corresponding MIG device. If not, the orchestrator dynamically creates a new partition on a candidate GPU, taking into account available unpartitioned memory, residual fragmentation, and predicted future demand. This allocation may be formulated as a bin-packing optimization, where GPUs represent bins and MIG slices represent items. A simple first-fit heuristic or a more advanced optimal-fit algorithm may be used to minimize wasted capacity and preserve flexibility for future requests.

Once the target GPU is identified, the orchestrator instructs the node-level GPU agent to create the required partition using the NVML API. The operation is performed non-disruptively, allowing existing MIG instances on the same GPU to continue executing due to hardware-level isolation inherent to the MIG architecture. After partition creation, the orchestrator finalizes scheduling by binding the workload to the node and exposing the assigned MIG device to the container via an environment variable or device path. The workload then executes on its dedicated slice as though running on an independent GPU.

During execution, the orchestrator or a node-level agent monitors utilization and performance metrics. When a job completes or releases its GPU resources, the system determines whether to retain the idle slice in a "keep-warm" state or delete it to free capacity. Retention avoids the overhead of repeated creation when similar workloads are expected, while deletion prevents fragmentation when demand shifts. These decisions may be based on historical workload patterns, predicted demand, or simple timeout policies.

The orchestration flow 600 also accounts for edge conditions to ensure stability. For example, when a GPU is fully subdivided into small slices and a new workload requires an entire device, the orchestrator can queue the request, wait for smaller jobs to finish, or migrate them to other GPUs before re-initializing that device. Because toggling MIG mode typically requires a hardware reset, the orchestrator batches such operations during low-utilization periods or applies predictive scheduling to minimize disruption. In some embodiments, MIG mode may remain permanently enabled, allowing creation of full-device partitions (for example, "7g.80gb") for large workloads. In all cases, the orchestrator ensures non-disruptive operation by never deleting or modifying an active slice.

Integration with existing scheduling frameworks reinforces deterministic behavior. In a Kubernetes implementation, a Dynamic Resource Allocation (DRA) driver intercepts each scheduling cycle and interacts with the MIG orchestrator to locate or provision a MIG device before the pod is bound. This two-phase reserve-then-bind scheduling guarantees that workloads are scheduled only when compatible GPU capacity is confirmed, preventing pods from landing on nodes lacking resources.

Because GPUs can be reconfigured in real time, the concept of "free resources" becomes elastic and adaptive. Completion of two small jobs may enable a large job to run, or the end of one large job may allow several smaller slices to be created. The orchestrator's ability to reshape GPUs dynamically eliminates idle capacity, minimizes fragmentation, and maximizes overall throughput across the cluster.

Through these operations, the dynamic MIG orchestration system provides adaptive GPU partitioning responsive to real-time workload demand, cluster-wide coordination of GPU resources, and intelligent scheduling that maximizes utilization while minimizing idle or unusable fragments.

By automating processes that previously required manual intervention, the system achieves a fluid, cloud-like GPU allocation model, enabling GPUs to be managed as elastic and composable resources analogous to CPU or memory in a virtualized environment. The invention operates entirely in software using existing GPU management APIs and requires no hardware modifications. Optional embodiments may integrate ML-based prediction to forecast workload demand and perform pre-emptive GPU re-partitioning, further reducing latency and improving responsiveness. The same orchestration principles apply to HPC batch schedulers, where the orchestrator intercepts job dispatch events and prepares suitable MIG configurations prior to job execution.

Accordingly, the dynamic MIG orchestration flow 600 illustrated in FIG. 6 transforms GPU resource management from a static, manual process into a dynamic, automated, and self-optimizing framework for heterogeneous workloads across distributed computing clusters.

Figure 7:
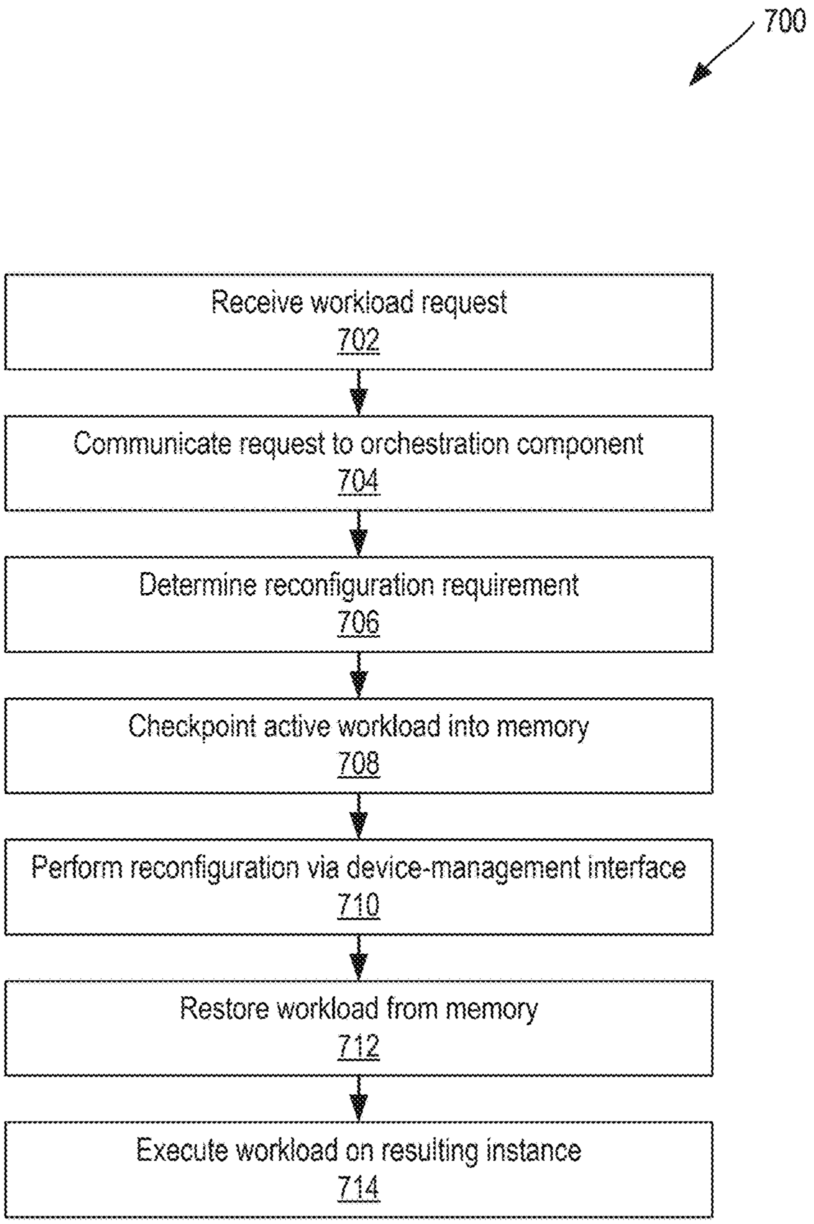
FIG. 7 illustrates an example flow diagram depicting a method for dynamically orchestrating graphical processing resources in a distributed computing environment, according to one aspect of the present disclosure.

FIG. 7 illustrates an example flow diagram 700 depicting a method for dynamically orchestrating graphical processing resources in a distributed computing environment, according to one aspect of the present disclosure. The flow represents coordinated operations performed by an orchestration system comprising a scheduling component, an orchestration component, and one or more local agents deployed on computing nodes that include partitioned graphical processing devices. The flow depicted in FIG. 7 may be implemented by a cluster scheduling and orchestration system as described in connection with FIGS. 1-6.

A scheduling component receives 702 a workload request specifying a graphical-processing or accelerator resource requirement. The scheduling component communicates 704 the workload request to an orchestration component that manages allocation of graphical processing resources across multiple nodes of the distributed cluster. The orchestration component determines 706, based on an inventory of available graphical processing instances and their utilization, whether to reconfigure (e.g., create, delete, or resize) an existing partitioned graphical processing resource to satisfy the workload request.

When reconfiguration is warranted, a local agent associated with a selected node checkpoints 708 an active workload associated with a graphical processing device into a memory to preserve the execution state during reconfiguration. The local agent issues 710 one or more control commands through a device-management interface to perform the determined reconfiguration, such as creating, deleting, or resizing a graphical-processing partition. Upon completion of the reconfiguration, the local agent restores 712 the active workload from the memory onto the resulting graphical-processing instance and resumes operation. The graphical-processing device then executes 714 the workload on the resulting partition while other workloads continue without interruption, enabling real-time, non-disruptive orchestration of graphical-processing resources across the cluster.

Optional implementations of the flow may include additional operations. In some embodiments, the orchestration component maintains a cluster-wide inventory of available graphical-processing instances and utilization metrics to guide the determination at 706. The local agent may migrate checkpointed workloads to other nodes through high-bandwidth interconnects, such as InfiniBand, NVLink, or Ethernet-RDMA, when local reconfiguration is not feasible. Telemetry data collected from each graphical-processing device may be reported to the orchestration component for predictive reconfiguration or defragmentation, and a machine-learning model trained on historical telemetry data may anticipate GPU demand to initiate pre-emptive resizing. In one embodiment, the orchestration system operates in conjunction with a dynamic resource-allocation interface integrated with a cluster scheduler, thereby supporting deterministic, reserve-then-bind scheduling. The resulting method provides adaptive and elastic management of graphical-processing resources, improving utilization efficiency and workload responsiveness across heterogeneous computing environments.

Other optional implementations may further enhance the orchestration framework described herein. In certain embodiments, the orchestration component maintains a cluster-wide inventory of graphical-processing instances to track global utilization, memory capacity, and partition configurations across multiple computing nodes. This comprehensive inventory enables the system to allocate resources more efficiently and to plan future partitioning actions based on real-time and historical utilization trends. The framework may also support cross-node migration, wherein an active workload is transferred to another computing node through a high-bandwidth interconnect, such as InfiniBand, NVLink, or Ethernet-RDMA. This operation allows the system to rebalance workloads dynamically, free capacity on overutilized nodes, and maintain non-disruptive operation during reconfiguration or maintenance events. Additionally, telemetry collection and reporting may be performed across the cluster to gather device health, performance, and utilization data from each graphical-processing device. The telemetry data is transmitted to the orchestration component for analysis, enabling data-driven optimization of resource scheduling, anomaly detection, and pre-emptive fault management. In certain implementations, the orchestration component employs a predictive orchestration model trained on historical telemetry data to forecast future workload demand and initiate proactive reconfiguration of partitioned resources before bottlenecks occur. Further, the orchestration component may execute predictive defragmentation, consolidating lightly utilized graphical-processing instances and freeing capacity for larger or time-critical workloads. By continuously analyzing cluster activity and reshaping partitions based on predicted utilization, the system minimizes idle fragments and maximizes overall throughput. Collectively, these optional implementations extend the dynamic orchestration framework to operate as a self-optimizing, telemetry-informed system, capable of maintaining high efficiency, balanced utilization, and consistent performance across diverse workloads in distributed computing environments.

In alternative embodiments, the method may begin when a scheduler interface receives a workload request specifying one or more GPU resource requirements. The scheduler interface then transmits the workload request to a GPU orchestration component, which manages GPU resource allocation across the cluster. The GPU orchestration component determines, based on an inventory of available GPU instances across multiple nodes, whether to reconfigure (e.g., create, delete, or resize) a MIG partition. This operation includes assessing current GPU utilization and memory profiles to identify an optimal configuration for the requested workload. A node-level agent checkpoints an active workload associated with a GPU device into system RAM to preserve the workload state prior to reconfiguration. The node-level agent issues commands through a GPU management API to perform the MIG reconfiguration corresponding to the orchestration decision. Once reconfiguration is complete, the node-level agent restores the active workload from system RAM onto the resulting GPU partition. Finally, the workload executes on the resulting GPU partition while other workloads continue without interruption, thereby ensuring non-disruptive GPU reallocation and continuous cluster operation.

The following describes optional implementations of the method for dynamically orchestrating GPU resources in a computing cluster. Implementations may include one or more of the following features. In some aspects, the techniques described herein provide an orchestration component that may maintain a global cluster map of GPU memory capacity, MIG profiles, and utilization metrics to improve decision accuracy during while the GPU orchestration component determines 706, based on an inventory of available GPU instances across multiple nodes, whether to reconfigure (e.g., create, delete, or resize) a MIG partition.

As an alternative to local reconfiguration, the active workload associated with a GPU device checkpointed by the node-level agent into system RAM to preserve the workload state prior to reconfiguration, may be migrated instead to a second GPU node via a high-bandwidth interconnect, such as InfiniBand, NVLink, or Ethernet-RDMA. Telemetry data may be collected from each GPU device and transmitted to the orchestration component to refine the resource inventory and inform subsequent partitioning decisions. The MIG orchestration component may apply a ML predictive model trained on historical telemetry data to anticipate GPU load and initiate preemptive MIG reconfiguration prior to workload arrival. The workload request received by the scheduler interface specifying one or more GPU resource requirements may be intercepted through a DRA API integrated with the cluster scheduler, ensuring deterministic scheduling via a two-phase reserve-and-bind cycle. The checkpointing and restoration operations executed by the node-level agent including node-level agent checkpointing of an active workload associated with a GPU device into system RAM to preserve the workload state prior to reconfiguration and restoring the active workload from system RAM onto the resulting GPU partition once reconfiguration is complete may be implemented using a container snapshot-and-restore utility, such as checkpoint/restore in userspace (CRIU) or an equivalent user-space checkpoint mechanism. The orchestration process may achieve up to a tenfold improvement in cluster efficiency compared with static GPU partitioning, as verified by latency and bidirectional bandwidth benchmarks. The orchestration component may perform predictive defragmentation, consolidating lightly utilized partitions and freeing capacity for anticipated large workloads. The computing cluster may host a natural-language-model inference service, wherein the orchestration component dynamically resizes GPU partitions according to the memory size and complexity of individual model requests.

The orchestration system described herein may include a ML-based prediction engine that forecasts GPU demand based on historical job telemetry. The prediction model may apply regression or reinforcement learning to determine the likelihood that certain MIG slice configurations will soon be required. When a predicted demand exceeds a threshold, the orchestrator may pre-emptively reconfigure GPUs—either coalescing smaller slices or splitting larger ones—so that the requested resources are immediately available when a workload arrives. This proactive scheduling approach further reduces queuing latency and contributes to the overall measured 10× cluster efficiency improvement.

In one representative scenario, a ChatGPT-style AI inference service submits workloads of varying model sizes to the GPU cluster. Each user query may require a different GPU memory footprint depending on model parameters. When a large model instance is requested, the orchestrator determines whether a suitable MIG slice exists. If not, the system checkpoints smaller workloads, merges their slices into a larger slice, and restores the larger model within seconds—all without interrupting the smaller jobs running on other slices. When smaller inference tasks subsequently dominate, the orchestrator reslices the GPUs into smaller partitions to maximize concurrency. This continuous adaptation enables latency-sensitive inference services to maintain stable response times while utilizing nearly the entire GPU capacity of the cluster.

The techniques described herein provide a number of measurable technical improvements to computing systems that employ GPUs in cluster environments. The disclosed orchestration framework enables non-disruptive GPU reconfiguration, allowing active workloads to continue executing while GPU partitions are created, deleted, or resized in real time. Through predictive elasticity, the system integrates telemetry data and ML models to proactively allocate GPU resources in anticipation of upcoming workload demand. Cross-node continuity is achieved through checkpoint-restore migration, which permits workloads to relocate seamlessly between GPU nodes connected by high-bandwidth fabrics such as InfiniBand or NVLink. Empirical evaluation of the system demonstrates substantial efficiency gains, including up to a ten-fold improvement in aggregate utilization and latency reduction when compared with conventional static partitioning techniques. The disclosed approach maintains full hardware compatibility, operating entirely in software through existing GPU management interfaces and requiring no modification to underlying GPU hardware.

Although certain embodiments are described with reference to NVIDIA MIG technology and particular APIs such as NVML, DCGM, CRIU, or the Kubernetes DRA framework, the inventive concepts are not limited to those implementations. Equivalent embodiments may employ alternative GPU architectures, checkpointing utilities, or scheduling frameworks. The orchestration logic may be implemented in any suitable programming language or container-management environment and deployed across private data centers, public cloud platforms, or hybrid infrastructures.

Collectively, the disclosed dynamic GPU orchestration system transforms fixed GPU partitioning into an adaptive, self-optimizing layer of compute infrastructure. By integrating checkpoint-restore migration, predictive telemetry analysis, and coordinated scheduler negotiation, the framework delivers cloud-like elasticity and near-maximal GPU utilization across heterogeneous workloads and cluster scales. These capabilities represent a technical improvement in computer operation itself, providing faster response times, reduced latency, and enhanced hardware efficiency for AI and high-performance-computing applications.

Figure 8:
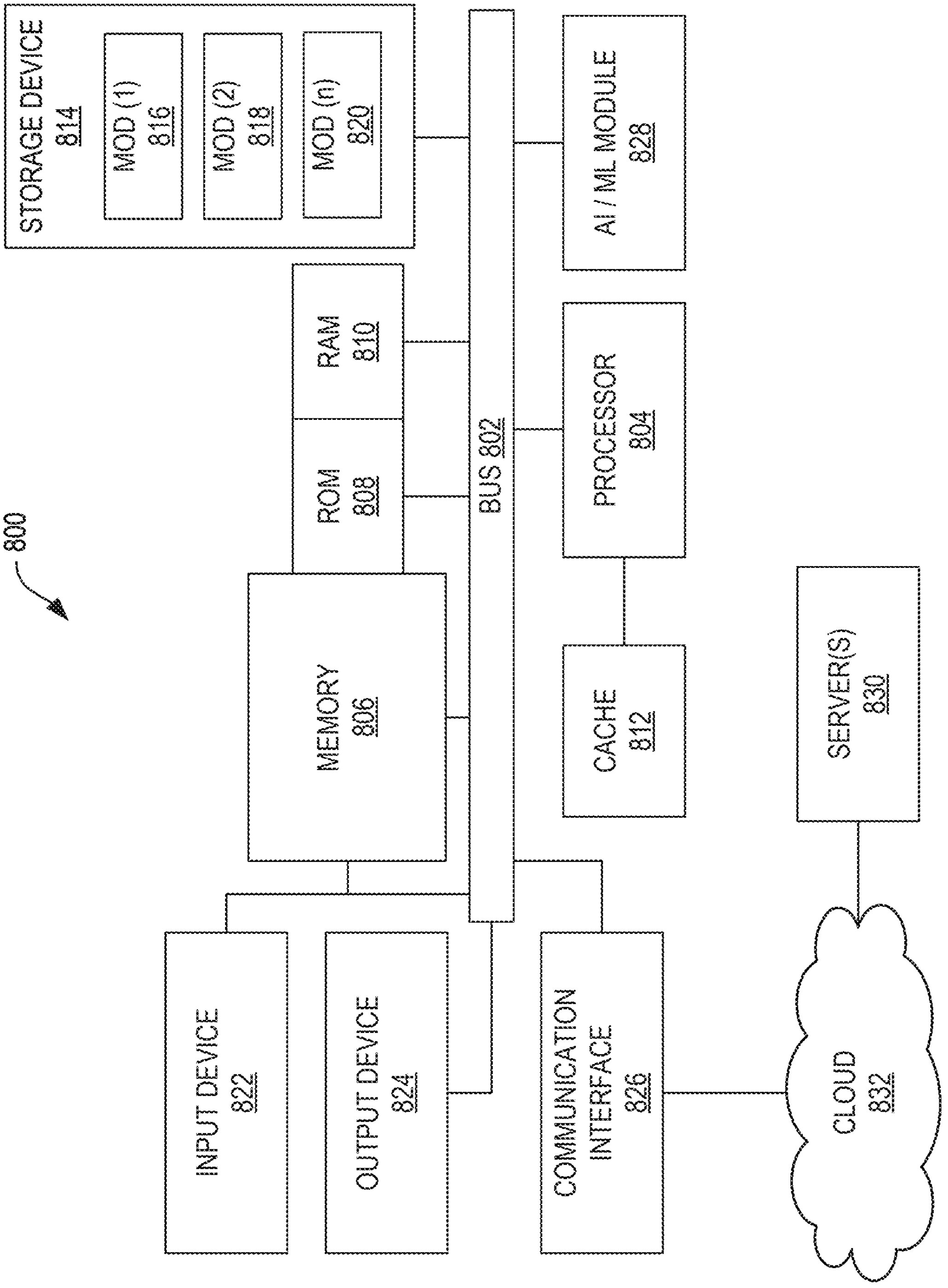
FIG. 8 illustrates embodiment of a hardware environment of a computing system for dynamic orchestration and migration of graphical processing resources within a cluster computing environment, according to one aspect of the present disclosure.

The foregoing FIGS. 1-7 illustrate representative process flows and functional interactions among software components used to implement the disclosed dynamic orchestration and migration of MIGs within a cluster computing environment. These figures collectively describe the logical sequence of operations performed by the scheduler interface, orchestration controller, node-level GPU agents, and associated telemetry and checkpoint-restore mechanisms. To further clarify how these software elements may be realized in practice, FIG. 8 depicts an example hardware and computing environment 800 suitable for executing the orchestration framework. The computing system 800 provides the underlying processors, memory resources, network interfaces, and storage components that support dynamic partitioning, reslicing, and migration of GPU workloads across distributed nodes in accordance with the methods and system architectures described herein.

Accordingly, FIG. 8 illustrates embodiment of a hardware environment of a computing system 800 for dynamic orchestration and migration of MIGs within a cluster computing environment, according to one aspect of the present disclosure. The hardware environment of the computing system 800 is optimized for implementing the complex operations for dynamically orchestrating and migrating MIGs in cluster computing environments as described above in connection with FIGS. 1-7, integrating both a robust, modular hardware setup and a detailed processor-based computing system. Referring back to FIG. 8, the components of the hardware environment of the computing system 800 are in communication with each other using a system bus 802. The computing system 800 can include a processing unit 804 (CPU or processor) and the system bus 802 that may couple various system components including the system memory 806, such as a read only memory 808 (ROM) and a RAM 810, to the processor 804. The computing system 800 can include a cache 812 of high-speed memory connected directly with, in close proximity to, or integrated as part of the processor 804.

The computing system 800 can copy data from the system memory 806, ROM 808, RAM 810, and/or a storage device 814 to the cache 812 for quick access by the processor 804. In this way, the cache 812 can provide a performance boost that avoids processor delays while waiting for data. These and other modules can control the processor 804 to perform various actions. Other system memory 806 may be available for use as well. The system memory 806 can include multiple different types of memory with different performance characteristics. The processor 804 can include any general-purpose processor and a hardware module or software module, such as module (1) 816, module (2) 818, up to module (n) 820 (where n is an integer greater than 2) stored in the storage device 814, to control the processor 804 as well as a special-purpose processor where software instructions are incorporated into the actual processor design. The processor 8045 may essentially be a completely self-contained computing system, containing multiple cores or processors, a system bus, memory controller, cache, etc. A multi-core processor may be symmetric or asymmetric.

To enable user interaction with the computing system 800, an input device 822 can represent any number of input mechanisms, such as a microphone for speech, a touch-protected screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system 800. The communications interface 826 can govern and manage the user input and system output. There may be no restriction on operating on any particular hardware arrangement and therefore the basic features here may easily be substituted for improved hardware or firmware arrangements as they are developed.

The storage device 814 can be a non-volatile memory and can be a hard disk or other types of computer readable media or storage which can store data that are accessible by a computer, such as magnetic cassettes, flash memory cards, solid state memory devices, digital versatile disks, cartridges, RAM, ROM, and hybrids thereof.

As discussed above, the storage device 814 can include the software modules 816, 818, 820 for controlling the processor 804. Other hardware or software modules are contemplated. The storage device 814 can be connected to the system bus 802. In some embodiments, a hardware module that performs a particular function can include a software component stored in a computer-readable medium in connection with the necessary hardware components, such as the processor 804, the system bus 802, the output device 824, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIGS. 1-7 and FIG. 8, the disclosed system and methods for dynamically orchestrating and migrating graphical processing resources in cluster computing environments can operate within a sophisticated, processor-based computing environment, exemplified by the computing system 800, designed to orchestrate, optimize, and secure dynamic orchestration and migration of MIGs in cluster computing environments operations with real-time precision. Central to the dynamic orchestration and migration of MIGs in cluster computing environments is a high-performance processor 804, which coordinates essential functions across memory, storage, data inputs, and external networks via a system bus 802. Equipped with a dedicated cache 812, the processor 804 ensures rapid access and retrieval of critical data, minimizing latency and providing the computational capacity to process complex instructions related to task orchestration, inventory management, and order fulfillment including continuous AI-driven orchestration components that apply a ML predictive model trained on historical telemetry data to anticipate GPU load and initiate preemptive MIG reconfiguration prior to workload arrival. The orchestration component may perform predictive defragmentation, consolidating lightly utilized partitions and freeing capacity for anticipated large workloads. The computing cluster may host a natural-language-model inference service, wherein the orchestration component dynamically resizes GPU partitions according to the memory size and complexity of individual model requests.

The computing system 800 includes a multi-tiered memory architecture where the system memory 806 includes the ROM 808 and the RAM 810. One aspect of the computing system 800 is its multi-layered storage infrastructure, anchored by the storage device 814. This storage device 814 includes various forms of non-volatile memory, such as solid-state drives (SSDs) and magnetic storage, housing critical data and software modules 816, 818, 820 necessary for controlling the processor 804 and executing operations described in FIGS. 1-7, for example. The storage device 814 stores complex software algorithms and ML models that analyze historical data and real-time conditions, generating optimized task sequences for each process flow described in FIGS. 1-7.

This configuration supports high-speed processing for tasks and data updates essential for dynamic operations for cloud resource cloning. While the ROM 808 provides core operational protocols and configurations, the high-speed RAM 810 enables the system to handle real-time updates to inventory levels, task queues, and predictive analytics. Furthermore, the storage device 814, including SSDs and magnetic storage, houses data and software modules necessary for executing the instructions necessary for dynamically orchestrating and migrating MIGs in cluster computing environments described in conjunction with FIGS. 1-7. This storage system retains historical records, operational data, and ML models, enabling complex task sequencing and optimized data management.

AI and ML modules 828 may be embedded within the computing system 800 enable advanced predictive analytics, transforming historical and real-time data into actionable insights. High-performance Tensor Processing Units (TPUs) and GPUs, and CPUs support continuous training of AI/ML models that enhance predictive modeling functionality. AI-driven algorithms analyze real-time operational data to anticipate potential issues arising from dynamically orchestrating and migrating MIGs in cluster computing environments allowing the system 800 to adjust tasks proactively. These AI/ML models 828 are housed on cloud servers 830, enabling parallel processing and providing adaptive, scalable insights across cloud resources or cloud service providers.

Leveraging TPUs, GPUs, and CPUs, the system 800 continuously trains the AI/ML models 828 that improve predictive modeling predictive fragmentation, and dynamically resizing partitions according to the memory size and complexity of individual model requests. AI-driven algorithms analyze real-time operational data to enable the system 800 to proactively adjust task allocations and priorities. The AI/ML models 828 are housed on cloud servers 828, where large datasets can be processed in parallel, providing scalable, adaptive insights to each cloud resource to improve various processes related to the dynamically orchestration and migration of MIGs in cluster computing environments. For example, the AI/ML modules 828 may operate to enhance user experience related to interactions with the cluster computing environment for dynamically orchestrating and migrating MIGs.

A suite of data collection and input/output (I/O) devices may be employed to monitor and interact with the cluster computing environment for dynamically orchestrating and migrating MIGs. The input devices 822, including barcode scanners, radio frequency identification (RFID) readers, IoT sensors, touchscreens, and handheld devices, capture real-time data. This data feeds into the processor 802 for seamless integration into the operational database, enabling precise, on-the-fly adjustments. The output devices 824, such as digital displays, wearable alerts, and screens, provide real-time feedback. The range of input and output devices, including the input device 822 and the output device 824, which enable users to interact directly with the cluster computing environment for dynamically orchestrating and migrating MIGs. These input devices 822 and output devices 824 provide real-time feedback and facilitate task monitoring, allowing users to stay informed of task progress, and any system updates. The input devices 822, such touchscreens and scanners, capture real-time data from users and transmit it to the processor 804, while the output devices 824 display prioritized task sequences, updates on order status, and notifications for operational adjustments.

In various embodiments, the computing system 800 is extended and supported by a cloud-based infrastructure 832, which provides scalable storage, processing power, and data analytics. The cloud-based infrastructure 832 integrates the servers 830 with the computing system 800 to perform the dynamic orchestration and migration of MIGs in cluster computing environments.

The scalable cloud-based infrastructure 832 also serves as the primary hub for inter-facility communication, linking remote hardware devices integrated into the cloud system to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 800 may be processor-based. The processor-based computing system 800 may operate within a cloud-enabled, modular hardware environment designed for scalability and high availability. This broader infrastructure includes additional AI-optimized processing units, such as TPUs and GPUs, which are capable of handling the intensive computational requirements of ML algorithms used for demand forecasting, slotting optimization, and real-time task adjustments. The modular cloud architecture ensures that each facility can access centralized data and processing power, dynamically adjusting workflows based on system demands. It also allows the orchestration module to allocate resources optimally, whether from central servers or distributed cloud resource-specific processors, depending on task priorities and operational constraints.

The scalable cloud-based infrastructure 832 provides flexible storage, processing, and analytics capabilities across distributed computing environments. Cloud integration supports storage of historical data, remote processing of compute-intensive ML models, and real-time data access for multiple facilities. Managed through containerized applications and virtual machines, the cloud framework enables continuous software updates, enhanced disaster recovery, and dynamic resource allocation to accommodate varying operational demands. Cloud-based inter-facility communication ensures synchronized, efficient operations, with additional processing capacity allocated as needed.

Energy efficiency is also prioritized within the design of the cluster computing environment for dynamically orchestrating and migrating MIGs, with power management protocols integrated across hardware components to reduce the system's environmental impact. The distributed power architecture, supported by uninterruptible power supplies (UPS) and backup generators, ensures reliable operation and minimizes downtime, allowing the system to maintain continuity and efficiency during power disruptions.

The cluster computing environment for dynamically orchestrating and migrating MIGs may include security protocols to provide data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as General Data Protection Regulation (GDPR) for data privacy, while data sovereignty protocols ensure that sensitive information meets regional compliance standards.

This computing system 800 represents an end-to-end, cloud-based server system that is adaptive and integrates AI-driven analytics, real-time data capture, robust security measures, and scalable cloud resources. The processor 804, memory modules, storage devices, and I/O components collectively enable data-driven decision-making, adjusting tasks in real time to respond to changing demands. Data flows seamlessly from cloud storage and I/O devices to the central processor, dynamically orchestrating resources to provide real-time updates to staff, maintain efficiency, and optimize performance across facilities. This robust, secure, and compliant system is designed to streamline operations, improve responsiveness, and support scalable growth in diverse logistics environments.

In summary, this integrated computing environment 800 offers a comprehensive solution for the cluster computing environment for dynamically orchestrating and migrating MIGs described in FIGS. 1-7, combining high-performance processing, advanced memory configurations, scalable cloud-based resources, and robust communication interfaces. It enables efficient and adaptive control over the cluster computing environment for dynamically orchestrating and migrating MIGs. Together, these elements establish a high-performance environment that supports continuous adaptation, precise task orchestration, and predictive optimization, fully realizing the functionalities described in the appended claims.

The presently disclosed cluster computing environment for dynamically orchestrating and migrating MIGs can harness AI technologies, integrating sophisticated ML models with cutting-edge computational infrastructure to solve complex problems, enhance decision-making, and execution of tasks across multiple cloud resources or cloud service providers. Designed with flexibility, scalability, and high-performance in mind, the system offers organizations a comprehensive AI solution tailored to their needs.

The cluster computing environment for dynamically orchestrating and migrating MIGs can be deployed across a range of environments, including public or private cloud infrastructures, fully on-premise infrastructures, or a hybrid configuration that is deployed using a combination of cloud-based and on-premises infrastructures. This flexibility allows organizations to select the best deployment strategy based on their operational, security, and scalability needs.

The computing system 800 of one or more computers perform particular operations or actions by virtue of having software, firmware, hardware, or a combination of them installed on the system that in operation causes or cause the system to perform the actions. One or more computer programs perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for dynamically orchestrating graphical processing unit (GPU) resources in a computing cluster. The method includes receiving, by a scheduler interface, a workload request specifying a GPU resource requirement. The method includes transmitting, by the scheduler interface, the workload request to a GPU orchestration component. The method includes determining, by the GPU orchestration component, based on an inventory of available GPU instances across multiple nodes, whether to reconfigure a multi-instance GPU (MIG) partition; checkpointing, by a node-level agent, an active workload associated with a GPU device into a memory; issuing, by the node-level agent, a command through a GPU management interface to perform a MIG reconfiguration corresponding to the determination; restoring, by the node-level agent, the active workload from the system ram onto a resulting GPU partition after completion of the MIG reconfiguration; and executing the workload on the resulting GPU partition while maintaining execution of other workloads without interruption. Other embodiments of this aspect include corresponding computer systems, apparatus, and computer programs recorded on one or more computer storage devices, each configured to perform the actions of the methods.

Implementations may include one or more of the following features. The method may include maintaining, by the GPU orchestration component, a cluster-wide map of GPU memory capacity, MIG profiles, and utilization metrics. The method may include migrating the checkpointed workload to a second GPU node through a high-bandwidth interconnect. The method may include collecting telemetry data from the GPU device and transmitting the telemetry data to the GPU orchestration component to inform subsequent partitioning decisions. The method may include applying, by the GPU orchestration component, a predictive model trained on historical telemetry data to anticipate GPU load and initiating pre-emptive reconfiguration of MIG partitions. The method may include intercepting the workload request through a dynamic resource-allocation (DRA) interface integrated with a cluster scheduler. The method may include employing, by checkpointing and restoring operations, a container snapshot-and-restore utility selected from a checkpoint/restore in userspace (CRIU) or an equivalent userspace checkpoint utility. The method may include improving efficiency of the computing cluster by a determined amount relative to static GPU partitioning as measured by latency and bidirectional bandwidth benchmarks. The method may include performing, by the GPU orchestration component, predictive defragmentation by consolidating lightly utilized partitions and freeing capacity for upcoming large workloads. The method may include hosting, by the computing cluster, a natural-language-model inference service and dynamically resizing GPU partitions based on a memory size of individual model requests. Implementations of the described techniques may include hardware, a method or process, or computer software on a computer-accessible medium.

One general aspect includes a computing system for dynamic orchestration of graphical processing unit (GPU) resources. The computing system includes a scheduler layer operable to receive workload requests and generate resource-allocation messages. The system includes a GPU orchestration module communicatively coupled to the scheduler layer and operable to maintain a cluster-wide inventory of multi-instance GPU (MIG) partitions and utilization data, to determine GPU reconfiguration actions based on the resource-allocation messages, and to issue corresponding orchestration commands. The system includes a plurality of GPU nodes, each may include: a MIG-capable GPU device; a memory operable to store checkpoint data for workloads, and a node-level GPU agent operable to: checkpoint an active workload into the memory; execute GPU management interface calls to reconfigure a MIG partition according to the orchestration commands, and restore the active workload onto a resulting MIG partition. The system includes a cluster interconnect providing communication among the plurality of GPU nodes and the GPU orchestration module. The computing system is operable to perform non-disruptive GPU partitioning and migration of workloads in real time. Other embodiments of this aspect include corresponding computer systems, apparatus, and computer programs recorded on one or more computer storage devices, each configured to perform the actions of the methods.

Implementations may include one or more of the following features. The GPU orchestration module may include a telemetry analyzer to receive utilization and health metrics from each GPU node and to update the cluster-wide inventory based on the metrics. The GPU orchestration module may be operable to execute a predictive orchestration engine trained to forecast GPU load and initiate proactive partition resizing. The node-level GPU agent may be operable to migrate a checkpointed workload to another GPU node over the cluster interconnect when local reconfiguration is not feasible. The cluster interconnect may include a high-bandwidth data-transfer fabric. The scheduler layer may include a dynamic resource-allocation interface implemented within a computerized scheduling environment. The computing system may be operable to achieve a utilization improvement of at least an order of magnitude relative to static GPU partitioning systems. Implementations of the described techniques may include hardware, a method or process, or computer software on a computer-accessible medium.

One general aspect includes a non-transitory computer-readable medium storing instructions that, when executed by one or more processors of a computing cluster, cause the computing cluster to: monitor incoming workload requests for graphical processing unit (GPU) resources. The instructions cause the computing cluster to determine, using a GPU orchestration process, whether a new multi-instance GPU (MIG) partition should be reconfigured based on cluster-wide utilization data. The instructions cause the computing cluster to checkpoint an active workload in memory. The instructions cause the computing cluster to invoke GPU management interface commands to perform the determined MIG reconfiguration on a GPU device. The instructions cause the computing cluster to restore the active workload from the memory onto a resulting MIG partition. The instructions cause the computing cluster to migrate the workload to another GPU node through a high-bandwidth interconnect when local reconfiguration is not feasible. The instructions cause the computing cluster to enable dynamic, non-disruptive GPU partitioning and workload migration across the computing cluster. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the instructions cause the computing cluster to collect telemetry data from each GPU device and adjust subsequent partitioning decisions based on the telemetry data. The instructions further cause the computing cluster to perform predictive orchestration by forecasting future GPU demand and executing pre-emptive partition adjustments prior to workload arrival. Implementations of the described techniques may include hardware, a method or process, or computer software on a computer-accessible medium.

Within the context of this disclosure, the term "module" is used as a broad and flexible term to describe a component of the cluster computing environment for dynamically orchestrating and migrating MIGs that may be implemented in hardware, software, firmware, or any combination thereof to accomplish one or more defined tasks or operations.

A hardware module may be a physical device or circuit designed to execute predefined functions. Examples include processors—CPUs, digital signal processors (DSPs), graphics processing units (GPUs)—as well as memory devices (RAM, ROM, flash), network interfaces, power management circuitry, and specialized devices such as application specific integrated circuits (ASICs) or field programmable gate arrays (FPGAs). These elements may communicate over buses, networks, or other interfaces that provide the bandwidth necessary for high speed data transfer and operation.

A software module includes instructions stored in memory and executed by one or more processing units. Such modules may take the form of executable code, dynamic-link libraries (DLLs), software-development kits (SDKs), virtual-machine environments, or full applications. They implement algorithms, data processing, decision logic, and user-interface functionality, may be written in languages such as C++, Python, or Java, and may interact with peer modules through well-defined APIs, middleware, or cloud services.

A firmware module includes low level code stored in non-volatile memory (e.g., electrically erasable programmable read only memory [EEPROM] or flash) that bridges hardware and higher-level software. Firmware provides the control logic required to configure, initialize, and manage hardware devices, handling tasks such as bootstrapping, protocol management, and power control. Firmware updates may be delivered remotely, allowing post deployment enhancements and security patches without altering hardware.

Modules may communicate with one another via inter process communication (IPC), message passing, remote procedure calls (RPC), or data buses. APIs, middleware layers, or network protocols (e.g., REST or gRPC) facilitate seamless interaction regardless of each module's underlying implementation, enabling distributed operation across local or networked environments.

The architecture embraces a plug-and-play approach, enabling modules to be added, removed, or modified dynamically. Such modularity may promote horizontal scaling—by deploying additional modules to increase parallel capacity—or vertical scaling—by augmenting individual modules with enhanced capabilities. This flexibility is particularly advantageous in distributed-computing contexts, including cloud platforms and multi-core processors.

Modules may support multithreading, parallel execution, or distributed computing in which tasks are partitioned across multiple hardware resources such as multi-core processors or distributed nodes. Load-balancing and task-synchronization mechanisms help ensure efficient resource utilization and reduced execution times for complex workloads.

Where appropriate, modules may integrate AI-driven components, including ML models or neural networks that perform pattern recognition, decision making, or predictive analytics. Such AI modules may rely on pre-trained models or continuous learning and may exploit specialized accelerators—such as tensor processing units (TPUs) or GPUs—to achieve high performance.

For time-sensitive applications, modules may employ real-time processing capabilities such as low-latency execution, task prioritization, and event-driven architectures. Real-time operating systems (RTOS) or dedicated task schedulers within firmware or software modules help guarantee that critical operations meet specified deadlines.

Security features may be embedded at both hardware and software levels, including encryption, authentication, and access control to protect data and maintain operational integrity. Secure hardware elements, such as trusted-platform modules (TPMs) or secure enclaves, may store cryptographic keys and execute guarded operations, while software modules may implement firewalls, intrusion-detection systems (IDS), or secure-communication protocols such as transport layer security/secure sockets layer (TLS/SSL).

Modules may manage data through embedded databases, cloud-storage services, or other persistence mechanisms, and may synchronize data across distributed systems using version control, replication strategies, and consistency models ranging from eventual to strong consistency.

The described modules may be equally suitable for cloud deployments and edge-computing frameworks. In the cloud, a module may scale elastically with demand, whereas at the edge it may perform latency-sensitive processing close to the data source, thereby reducing reliance on centralized resources.

In power-constrained environments—such as Internet-of-Things (IoT) devices or battery-operated systems—modules may adopt energy-efficient designs that incorporate power-aware algorithms, dynamic voltage scaling, sleep states, or energy-harvesting technologies. Hardware modules may exploit semiconductor processes optimized for low energy consumption.

Each module may function as an independent, reusable component within the overall system architecture while remaining interoperable with peer modules. This approach affords flexibility, facilitates upgrades and maintenance, and supports deployment on dedicated hardware, within virtualized environments, or across distributed networks—all while delivering the comprehensive functionality described herein.

In certain embodiments, the computer-readable storage devices, media, and memories may include wired or wireless signals that convey a bit stream or similar constructs. However, when the phrase "non-transitory computer-readable storage media" is used, it expressly excludes forms such as energy, carrier signals, electromagnetic waves, and signals per se.

The methods described herein may be realized through computer-executable instructions stored on, or otherwise made available by, computer-readable media. Such instructions may configure a general-purpose computer, a special-purpose computer, or a dedicated processing device to execute one or more of the functions outlined above. Portions of the required computing resources may reside on, and be accessed through, a network. The instructions themselves may be provided as binaries, intermediate-format instructions such as assembly language, firmware, or source code. Suitable computer-readable media include magnetic or optical storage, flash memory, universal serial bus (USB) devices equipped with non-volatile memory, and network-attached storage devices, among others.

Devices that implement these methods may combine hardware, firmware, and/or software and may assume a variety of form factors, including laptops, smartphones, small-form-factor personal computers, personal digital assistants, rack-mount appliances, and standalone units. Equivalent functionality may also be embodied in peripherals or add-in cards, or distributed across multiple chips or processes within a single device.

The instructions, the media that convey those instructions, the computing resources that execute them, and the supporting structures together constitute means for providing the functionality described in this disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for dynamically orchestrating graphical processing resources in a distributed computing environment, the method comprising:

- receiving, by a computing system comprising a scheduling component, a workload request specifying a graphical processing resource requirement;
- communicating, by the scheduling component, the workload request to an orchestration component that manages allocation of graphical processing resources across multiple computing nodes;
- determining, by the orchestration component, based on an inventory of available graphical processing instances on the computing nodes, whether to reconfigure a partitioned graphical processing resource on a selected computing node of the multiple computing nodes;
- checkpointing, by a local agent of the computing system residing on the selected computing node, an active workload associated with a graphical processing device of the selected computing node into a local memory of the selected computing node to preserve an execution state of the workload;
- issuing, by the local agent, a command through a device management interface to perform a reconfiguration of the partitioned graphical processing resource of the selected computing node corresponding to the determination, wherein the reconfiguration is performed while the active workload remains on the selected computing node and without migrating the active workload to a different computing node;
- restoring, by the local agent, the active workload from the local memory of the selected computing node onto a resulting graphical processing instance of the selected computing node after completion of the reconfiguration; and
- executing, by the computing system, the workload on the resulting graphical processing instance while maintaining execution of other workloads without interruption.

2. The method of claim 1, comprising maintaining, by the orchestration component, a cluster-wide inventory comprising available graphical processing instances, corresponding memory capacities, and utilization metrics for the computing nodes.

3. The method of claim 1, further comprising migrating, by the orchestration component, a checkpointed active workload to another computing node through an interconnect.

4. The method of claim 1, comprising collecting telemetry data representing utilization, temperature, and error conditions from each graphical processing device and transmitting the telemetry data to the orchestration component to inform subsequent allocation decisions.

5. The method of claim 4, comprising applying, by the orchestration component, a predictive model trained on historical telemetry data to forecast graphical processing demand and initiating pre-emptive reconfiguration of partitioned graphical resources.

6. The method of claim 1, comprising intercepting, by the scheduling component, the workload request through a dynamic resource-allocation interface integrated with a cluster scheduler.

7. The method of claim 1, comprising performing, by the computing system, predictive defragmentation by consolidating processing instances and freeing capacity for anticipated workloads.

8. The method of claim 1, comprising hosting, by the computing system, an artificial intelligence inference service that dynamically resizes graphical processing partitions based on memory or compute requirements of individual inference tasks.

9. A computing system for dynamic orchestration of graphical processing resources in a distributed computing environment, the system comprising:

- a scheduling component operable to receive workload requests and generate resource-allocation messages;
- an orchestration component communicatively coupled to the scheduling component and operable to maintain an inventory of graphical processing instances across multiple computing nodes, determine whether to reconfigure a partitioned graphical processing resource on a selected computing node of the multiple computing nodes based on the workload requests, and issue reconfiguration commands; and
- a local agent residing on the selected computing node, the local agent operable to:
  - store an execution state of an active workload associated with a graphical processing device of the selected computing node into a local memory of the selected computing node to create a checkpoint;
  - issue one or more control commands through a device management interface to perform the reconfiguration of the partitioned graphical processing resource of the selected computing node in accordance with the reconfiguration commands, wherein the reconfiguration is performed while the active workload remains on the selected computing node and without migrating the active workload to a different computing node;
  - restore the active workload from the local memory of the selected computing node onto a resulting graphical processing instance of the selected computing node following completion of the reconfiguration; and resume execution of the workload on the resulting graphical processing instance while maintaining execution of other workloads without interruption;

wherein the computing system is operable to perform non-disruptive, real-time allocation, resizing, and migration of graphical processing resources across the distributed computing environment.

10. The system of claim 9, wherein the orchestration component is operable to maintain a cluster-wide inventory comprising available graphical-processing instances, corresponding memory capacities, and utilization metrics for the computing nodes.

11. The system of claim 9, wherein the local agent is operable to migrate a checkpointed workload to another computing node through an interconnect.

12. The system of claim 9, comprising a telemetry analyzer to collect telemetry data comprising utilization, temperature, and error-condition data from each graphical-processing device and to transmit the telemetry data to the orchestration component for adaptive resource management.

13. The system of claim 12, wherein the orchestration component includes a predictive orchestration engine trained on historical telemetry data to forecast graphical-processing demand and to initiate pre-emptive reconfiguration of partitioned resources.

14. The system of claim 9, wherein the scheduling component comprises a dynamic resource-allocation interface integrated with a cluster scheduler to provide deterministic reserve-then-bind scheduling of graphical-processing resources.

15. A non-transitory computer-readable medium storing instructions that, when executed by one or more processors of a computing system for dynamic orchestration of graphical processing resources in a distributed computing environment, cause the computing system to:

receive, by a scheduling component, a workload request specifying a graphical processing resource requirement;

communicate, by the scheduling component, the workload request to an orchestration component that manages allocation of graphical processing resources across multiple computing nodes;

determine, by the orchestration component, based on an inventory of available graphical processing instances on the computing nodes, whether to reconfigure a partitioned graphical processing resource on a selected computing node of the multiple computing nodes;

checkpoint, by a local agent of the computing system residing on the selected computing node, an execution state of an active workload associated with a graphical processing device of the selected computing node into a local memory of the selected computing node to preserve an execution state of the workload;

issue, by the local agent, one or more control commands through a device management interface to perform the reconfiguration of the partitioned graphical processing resource of the selected computing node corresponding to the determination, wherein the reconfiguration is performed while the active workload remains on the selected computing node and without migrating the active workload to a different computing node;

restore, by the local agent, the active workload from the local memory of the selected computing node onto a resulting graphical processing instance of the selected computing node after completion of the reconfiguration; and execute, by the computing system, the workload on the resulting graphical processing instance while maintaining execution of other workloads without interruption to enable real-time, non-disruptive allocation, resizing, and migration of graphical processing resources across the distributed computing environment.

16. The non-transitory computer-readable medium of claim 15, wherein the instructions further cause the computing system to maintain a cluster-wide inventory of graphical-processing instances and utilization metrics to guide reconfiguration decisions.

17. The non-transitory computer-readable medium of claim 15, wherein the instructions further cause the computing system to migrate a checkpointed workload to another computing node through an interconnect.

18. The non-transitory computer-readable medium of claim 15, wherein the instructions further cause the computing system to collect and transmit telemetry data describing utilization, temperature, and error conditions of graphical-processing devices to the orchestration component for analysis.

19. The non-transitory computer-readable medium of claim 18, wherein the instructions further cause the computing system to apply a predictive model trained on historical telemetry data to forecast graphical-processing demand and perform pre-emptive partition resizing.

20. The non-transitory computer-readable medium of claim 15, wherein the instructions further cause the computing system to dynamically resize graphical-processing partitions in response to memory or compute requirements of variable artificial-intelligence inference tasks.

* * * * *